United States Patent [19]
Igarashi

[11] Patent Number: 5,920,599
[45] Date of Patent: Jul. 6, 1999

[54] SOFT DECISION DECODER

[75] Inventor: Hideki Igarashi, Tokyo, Japan

[73] Assignee: Mitsubishi Denki Kabushiki Kaisha, Tokyo, Japan

[21] Appl. No.: 08/798,214

[22] Filed: Feb. 10, 1997

[30] Foreign Application Priority Data

Aug. 29, 1996 [JP] Japan ................................. 8-228858

[51] Int. Cl.$^6$ .................................................. H03D 1/00
[52] U.S. Cl. ........................ 375/341; 375/341; 375/317; 375/316
[58] Field of Search ................................ 375/341, 39, 58, 375/60, 94, 121, 106, 346, 350, 295, 265, 280, 331, 342, 298, 316, 263, 264, 285, 317

[56] References Cited

U.S. PATENT DOCUMENTS

| | | | |
|---|---|---|---|
| 5,361,400 | 11/1994 | Kazecki et al. | 455/63 |
| 5,363,408 | 11/1994 | Paik et al. | 375/39 |
| 5,636,251 | 6/1997 | Citta et al. | 375/341 |

OTHER PUBLICATIONS

A Soft–Output Bidirectional Decision Feedback Equalization Technique for TDMA Cellular Radio, Yow–Jong Liu, et al., IEEE Journal on Selected Areas in Communications, vol. 11, No. 7, Sep. 1993, pp. 1034–1045.

*Primary Examiner*—Stephen Chin
*Assistant Examiner*—Shuwang Liu

[57] ABSTRACT

A soft decision decoder including an adaptive equalizer and a reliability information generator. The reliability information generator, receiving soft decision data and equalized square error from the adaptive filter, performs delay detection of the soft decision data, and then rotates the phase of the delay detected data so as to match the data to transmitted data components. The rotated data is weighted with the average value of the equalized square error to generate the reliability information for the soft decision Viterbi decoding. This makes it possible to obviate the exponential or logarithm calculations which are conventionally needed for generating the reliability information for carrying out the soft decision Viterbi decoding of the output of the adaptive equalizer, and hence to reduce the enormous amount of calculations and the size of hardware like DSP for performing the calculations.

5 Claims, 13 Drawing Sheets

FIG. 3
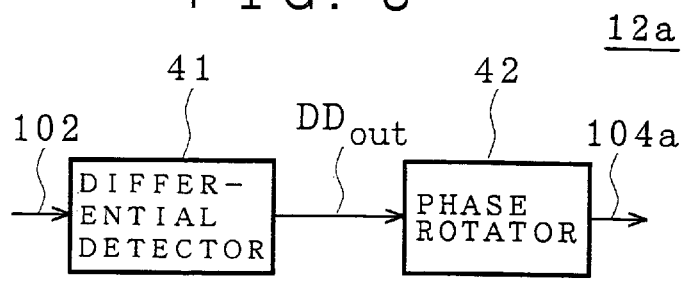
FIG. 4A
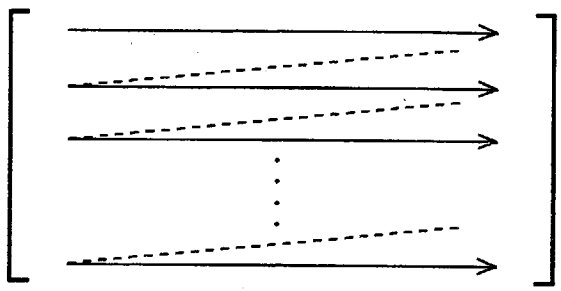
FIG. 4B
$$\begin{bmatrix} L_1 & L_2 & \cdots & \cdots & L_M \\ L_{M+1} & L_{M+2} & \cdots & \cdots & L_{2M} \\ \vdots & \vdots & & & \vdots \\ L_{(N-1)M+1} & L_{(N-1)M+2} & \cdots & \cdots & L_{NM} \end{bmatrix}$$
FIG. 4C
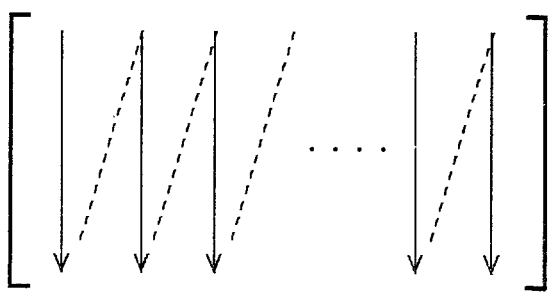

FIG. 20
(PRIOR ART)

| SIGNAL POINTS OF PREVIOUS SYMBOL $(x_{n-1}^-, y_{n-1}^-)$ | SIGNAL POINTS OF PRESENT SYMBOL $(x_n^-, y_n^-)$ | | | | |
|---|---|---|---|---|---|
| | TRANSMITTED DATA (X,Y) | 00 | 01 | 11 | 10 |
| | PHASE DIFFERENCE $\Delta\theta$ | 0 | $\pi/2$ | $\pi$ | $-\pi/2$ |
| $-1,-1$ | | $-1,-1$ | $1,-1$ | $1,1$ | $-1,1$ |
| $1,-1$ | | $1,-1$ | $1,1$ | $-1,1$ | $-1,-1$ |
| $1,1$ | | $1,1$ | $-1,1$ | $-1,-1$ | $1,-1$ |
| $-1,1$ | | $-1,1$ | $-1,-1$ | $1,-1$ | $1,1$ |

SOFT DECISION DECODER

BACKGROUND OF THE INVENTION

1. Field of the Invention

The present invention relates to a soft decision decoder employed by digital radio communication apparatuses for digital mobile communications, digital satellite communications, digital mobile satellite communications, or the like.

2. Description of Related Art

In digital data transmission systems, error correction is usually used for correcting errors of data occurred on transmission channels. Convolutional codes are known as a typical error correcting code, and Viterbi decoding is most frequently used as a decoding method for the convolutional codes. The Viterbi decoding is-divided into hard decision and soft decision: the former decides the input data to the decoder in accordance with the binary rule whether it is 0 or 1, and the latter provides the input data to the decoder with multiple values. Generally, the soft decision Viterbi decoding can improve the characteristic of the decoder as compared with the hard decision Viterbi decoding.

In the digital mobile communications, intersymbol interference will some times occur which causes interference to the following symbols owing to delay spread due to multipath channel. One of the techniques to reduce the influence of the interference, an adaptive equalizer is known effective.

FIG. 19 is a block diagram showing a conventional soft decision decoder disclosed in "A Soft-Output Bidirectional Decision Feedback Equalization Technique for TDMA Cellular Radio", Y. Liu, M. Wallace and J. W. Ketchum, pp. 1034–1045, IEEE Journal on Selected Areas in Communications, Vol. 11, No. 7, September 1993. In this figure, the reference numeral 11 designates an adaptive equalizer, 12 designates a reliability information generator, 13 designates a deinterleaver, 14 designates a soft decision Viterbi decoder, 101 designates a base band signal as a received signal, 102 designates soft decision data, 103 designates an equalized square error, 104 designates reliability information, 105 designates deinterleaved reliability information, and 106 designates decoded data.

The adaptive equalizer 11, receiving the base band signal 101, operates such that the equalized square error 103 becomes minimum to reduce the influence of the intercode interference in the base band signal 101, and outputs the soft decision data 102 and equalized square error 103. Specifically, the adaptive equalizer 11 successively delays the base band signal 101 and multiples the delayed signals by tap coefficients, followed by addition of the products, thereby outputting the addition result as the soft decision data 102. Besides, it generates and outputs the equalized square error 103 from an equalization error calculated from the soft decision data 102 and the hard decision result of the soft decision data 102. In the course of this, the adaptive equalizer 11 controls the tap coefficients so that the equalized square error 103 becomes as small as possible, thereby reducing the effect of the intercede interference in the base band signal 101.

The reliability information generator 12, receiving the soft decision data 102 and the equalized square error 103 fed from the adaptive equalizer 11, generates on the basis of these input data the reliability information 104 for the soft decision Viterbi decoding by using a likelihood function which becomes maximum on the Gaussian transmission path when coherent detection is performed of the quadrature phase modulation (called QPSK hereinafter) signal which has undergone differential coding. The reliability information L(X) and L(Y) corresponding to the transmitted data X and Y can be obtained by taking logarithm of the ratio of the probability the transmitted data X (or Y) becomes one to that it becomes zero, as expressed by the following equations (1a) and (1b).

$$L(X) = \log \frac{pdf[X=1]}{pdf[X=0]} \quad (1a)$$

$$L(Y) = \log \frac{pdf[Y=1]}{pdf[Y=0]} \quad (1b)$$

FIGS. 20 and 21 are drawings for explaining the above-mentioned differential coding which will now be described referring to these figures. The differential coding refers to a method which converts transmitted data into a phase difference between two consecutive symbols, and then transmits the phase difference. FIG. 20 illustrates an example of the differential coding rule, which shows, for respective transmitted data (X, Y), the phase differences $\Delta\theta$ which are actually transmitted, the signal points $(x^-_{n-1}, y^-_{n-1})$ of the previous symbol, and the signal points $(x^-_n, y^-_n)$ of the present symbol. For example, if the signal point $(x^-_{n-1}, y^-_{n-1})$ of the previous symbol is (−1, −1), the transmitted data (0, 1) is converted by rotating its phase by $\pi/2$ into (1, −1) which is sent as the signal point of the present symbol $(x^-_n, y^-_n)$. FIG. 21 illustrates this on a phase plane. Since the amplitude and phase of the received signal abruptly change owing to fading in the digital mobile communications, such differential coding is often employed.

The operation of the reliability information generator 12 will now be described.

FIG. 22 is a block diagram showing an internal configuration of the reliability information generator 12 as shown in FIG. 19. In this figure, the reference numerals 21a–21h designate error calculators, 22a–22h designate weighting circuits, 23 designates an averaging circuit, 24a–24h designate exponential calculators, 25a and 25b designate adders, 26a and 26b designate logarithmic calculators, and 27 designates a subtracter.

In the reliability information generator 12, the error calculators 21a–21d calculate the errors between the soft decision data 102 fed from the adaptive equalizer 11 and the patterns associated with the transmitted data X of "1", and the error calculators 21e–21h calculate the errors between the soft decision data 102 and the patterns associated with the transmitted data X of "0". For example, the patterns associated with the transmitted data X of "1" are listed in the right half of the column of the signal points of the present symbols. There are four patterns: $(x^-_n, y^-_n)$=(1, 1) and $x^-_{n-1}$=−1; $(x^-_n, y^-_n)$=(1, −1) and $y^-_{n-1}$=1; $(x^-_n, y^-_n)$=(−1, −1) and $x^-_{n-1}$=1, $(x^-_n, y^-_n)$=(−1, 1) and $y^-_{n-1}$=−1. The error calculators 21a–21d calculate the errors between the four patterns and the soft decision data 102, respectively, and output the errors. Likewise, the error calculators 21e–21h calculate errors between the soft decision data 102 and the four patterns associated with the transmitted data X of "0", which are listed in the left half of the column of the signal points of the present symbols in FIG. 20, and output errors.

The weighting circuits 22a–22d weight the outputs from the error calculators 21a–21d, respectively, by dividing them by the average value $\sigma_n^2$ obtained by averaging by the averaging circuit 23 the equalized square error 103 fed from the adaptive equalizer 11. The exponential calculators 24a–24d perform the exponential operation on the outputs of the weighting circuits 22a–22d, respectively, and the adder 25a adds the outputs of the exponential calculators 24a–24d, and then the logarithmic calculator 26a performs the logarithmic operation on the output of the adder 25a. Likewise, the weighting circuits 22e–22h, exponential calculators 24e–24h, the adder 25b and the logarithmic calculator 26b perform the weighting, the exponential operation, addition and logarithmic operation on the outputs of the error calculators 21e–21h, respectively. Finally, the subtracter 104 obtains the difference between the outputs of the logarithmic calculator 26a and logarithmic calculator 26b, and outputs the difference L(X) as the reliability information 104. With regard to the transmitted data Y, the value L(Y) calculated in the similar manner is output as the reliability information 104.

The foregoing processes are represented by the following expressions (2a) and (2b), where $(x_n, y_n)$ denotes the soft decision data 102 of the n-th symbol, and $\sigma_n^2$ denotes the average value of the equalized square error 103 over $N\omega$ symbols. The average value $\sigma_n^2$ is expressed by the following equation (3), where $e_n^2$ denotes the equalized square error 103 of the n-th symbol.

$$L(X) = \log\left(\exp\left\{-\frac{1}{2\sigma_n^2}[(x_n-1)^2 + (y_n-1)^2 + (x_{n-1}+1)^2]\right\} + \right. \quad (2a)$$

$$\exp\left\{-\frac{1}{2\sigma_n^2}[(x_n-1)^2 + (y_n+1)^2 + (y_{n-1}-1)^2]\right\} +$$

$$\exp\left\{-\frac{1}{2\sigma_n^2}[(x_n+1)^2 + (y_n+1)^2 + (x_{n-1}-1)^2]\right\} +$$

$$\left.\exp\left\{-\frac{1}{2\sigma_n^2}[(x_n+1)^2 + (y_n-1)^2 + (y_{n-1}+1)^2]\right\}\right) -$$

$$\log\left(\exp\left\{-\frac{1}{2\sigma_n^2}[(x_n-1)^2 + (y_n-1)^2 + (x_{n-1}-1)^2]\right\} + \right.$$

$$\exp\left\{-\frac{1}{2\sigma_n^2}[(x_n-1)^2 + (y_n+1)^2 + (y_{n-1}+1)^2]\right\} +$$

$$\exp\left\{-\frac{1}{2\sigma_n^2}[(x_n+1)^2 + (y_n+1)^2 + (x_{n-1}+1)^2]\right\} +$$

$$\left.\exp\left\{-\frac{1}{2\sigma_n^2}[(x_n+1)^2 + (y_n-1)^2 + (y_{n-1}-1)^2]\right\}\right)$$

$$L(Y) = \log\left(\exp\left\{-\frac{1}{2\sigma_n^2}[(x_n-1)^2 + (y_n-1)^2 + (y_{n-1}+1)^2]\right\} + \right. \quad (2b)$$

$$\exp\left\{-\frac{1}{2\sigma_n^2}[(x_n-1)^2 + (y_n+1)^2 + (x_{n-1}+1)^2]\right\} +$$

$$\exp\left\{-\frac{1}{2\sigma_n^2}[(x_n+1)^2 + (y_n+1)^2 + (y_{n-1}-1)^2]\right\} +$$

$$\left.\exp\left\{-\frac{1}{2\sigma_n^2}[(x_n+1)^2 + (y_n-1)^2 + (x_{n-1}-1)^2]\right\}\right) -$$

$$\log\left(\exp\left\{-\frac{1}{2\sigma_n^2}[(x_n-1)^2 + (y_n-1)^2 + (y_{n-1}-1)^2]\right\} + \right.$$

$$\exp\left\{-\frac{1}{2\sigma_n^2}[(x_n-1)^2 + (y_n+1)^2 + (x_{n-1}-1)^2]\right\} +$$

$$\exp\left\{-\frac{1}{2\sigma_n^2}[(x_n+1)^2 + (y_n+1)^2 + (y_{n-1}+1)^2]\right\} +$$

$$\left.\exp\left\{-\frac{1}{2\sigma_n^2}[(x_n+1)^2 + (y_n-1)^2 + (x_{n-1}+1)^2]\right\}\right)$$

$$\sigma_n^2 = \frac{1}{N_\omega} \sum_{j=-N_\omega/2+1}^{j=N_\omega/2} e_{n-j}^2 \quad (3)$$

Let us assume that the transmitted data (X, Y) of (0, 1) is transmitted as in the foregoing example about the differential coding. This means that the actually transmitted previous symbol is (−1, −1) and the present symbol is (1, −1). When there is little noise on a transmission path, the soft decision data 102 output from the adaptive equalizer 11 shown in FIG. 19 will take values close to $(x_{n-1}, y_{n-1})=(-1, -1)$ and $(x_n, y_n)=(1, -1)$, respectively. In this case, only the sixth exponential (exp) function in expression (2a) takes a value close to one, and all the other exponential (exp) functions take values close to zero. Thus, the reliability information L(X) of expression (2a) becomes negative, which indicates with high probability that the transmitted data X will be "0". In expression (2b), on the other hand, only the second exponential (exp) function takes a value close to one, and all the other exponential (exp) functions take values close to zero. Accordingly, the reliability information L(Y) of expression (2b) becomes positive, which indicates with high probability that the transmitted data Y will be "1".

The reliability information 104 generated by the reliability information generator 12 is fed to the deinterleaver 13 which generates the deinterleaved reliability information 105 by rearranging the reliability information 104 in accordance with the interleaving rule at the transmitting side to restore the convolutionally coded data. The soft decision Viterbi decoder 14, receiving the deinterleaved reliability information 105 from the deinterleaver 13, performs the soft decision Viterbi decoding, and outputs the decoded data 106. Specifically, the soft decision Viterbi decoder 14 generates branch metrics by obtaining the square errors between the deinterleaved reliability information 105 fed from the deinterleaver 13 and the candidates of the transmitted data, and stores in a path metric memory path metrics updated by ACS (Add-Compare-Select) operation, in which the branch metrics are added to path metrics, and the resultant sums about a plurality of branches are added and then selected. Subsequently, the soft decision Viterbi decoder 14 outputs the decoded data 106 by sequentially tracing the paths starting from the path with a minimum path metric.

The conventional soft decision decoder with such an arrangement has a problem in that it requires an enormous amount of calculation or a large scale of hardware when implementing the calculation in the reliability information generator 12 including the exponential and logarithmic functions in expressions (2a) and (2b) by using hardware such as a DSP (digital signal processor).

SUMMARY OF THE INVENTION

The present invention is carried out to solve the problem, and its object is to provide a soft decision decoder capable of reducing the amount of calculation or hardware needed for generating the reliability information for performing the soft decision Viterbi decoding.

According to a first aspect of the present invention, there is provided a soft decision decoder comprising: an adaptive equalizer for outputting soft decision data by reducing an effect of intercode interference in a received signal; a reliability information generator for generating reliability information by performing delay detection of the soft decision data to output first data, and by performing phase rotation of the first data to produce second data, the phase rotation being carried out such that the second data corresponds to transmitted data components, thereby outputting second data as the reliability information; and a soft decision Viterbi decoder for performing soft decision Viterbi decoding based on the reliability information to output decoded data.

Here, the adaptive equalizer may further output an equalized square error besides the soft decision data; and the reliability information generator may generate the reliability information by weighting the second data with an average value of the equalized square error.

The adaptive equalizer may further output tap coefficients besides the soft decision data and equalized square error; and the reliability information generator may generate the reliability information by weighting the second data with the average value of the equalized square error and a result of detection of divergence of algorithm of the adaptive equalizer, the detection of divergence being carried out using the tap coefficients.

According to a second aspect of the present invention, there is provided a soft decision decoder comprising: an adaptive equalizer for outputting soft decision data and an equalized square error by reducing an effect of intercode interference in a received signal; a reliability information generator for generating reliability information by weighting with an average value of the equalized square error a difference between a first minimum value and a second minimum value, the first minimum value being a minimum value of errors between the soft decision data and patterns of two consecutive symbols associated with transmitted data of "1", and the second minimum value being a minimum value of errors between the soft decision data and patterns of two consecutive symbols associated with transmitted data of "0"; and a soft decision Viterbi decoder for performing soft decision Viterbi decoding based on the reliability information to output decoded data.

Here, the adaptive equalizer may further output tap coefficients besides the soft decision data and equalized square error; and the reliability information generator may generate the reliability information by weighting the difference between the first minimum value and the second minimum value with the average value of the equalized square error and a result of detection of divergence of algorithm of the adaptive equalizer, the detection of divergence being carried out using the tap coefficients.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a block diagram showing an internal configuration of a reliability information generator in the embodiment 1;

FIGS. 4A–4C are diagrams illustrating the operational scheme of the deinterleaver in the embodiment 1;

FIG. 20 is a table illustrating an example of a differential coding rule;

DETAILED DESCRIPTION OF THE PREFERRED EMBODIMENTS

The invention will now be described with reference to the accompanying drawings.

Embodiment 1

Figure 1:
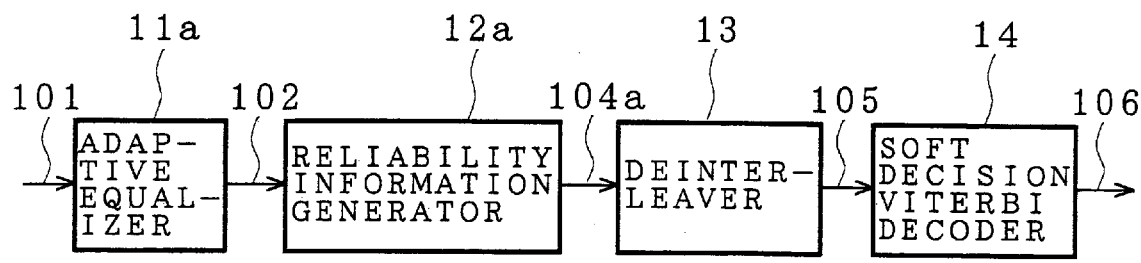
FIG. 1 is a block diagram showing an embodiment 1 of a soft decision decoder in accordance with the present invention.
Figure 19:
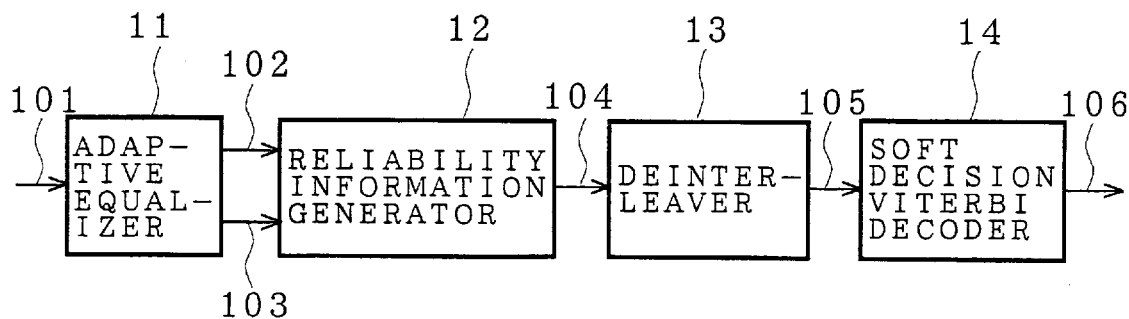
FIG. 19 is a block diagram showing the configuration of a conventional soft decision decoder.
Figure 21:
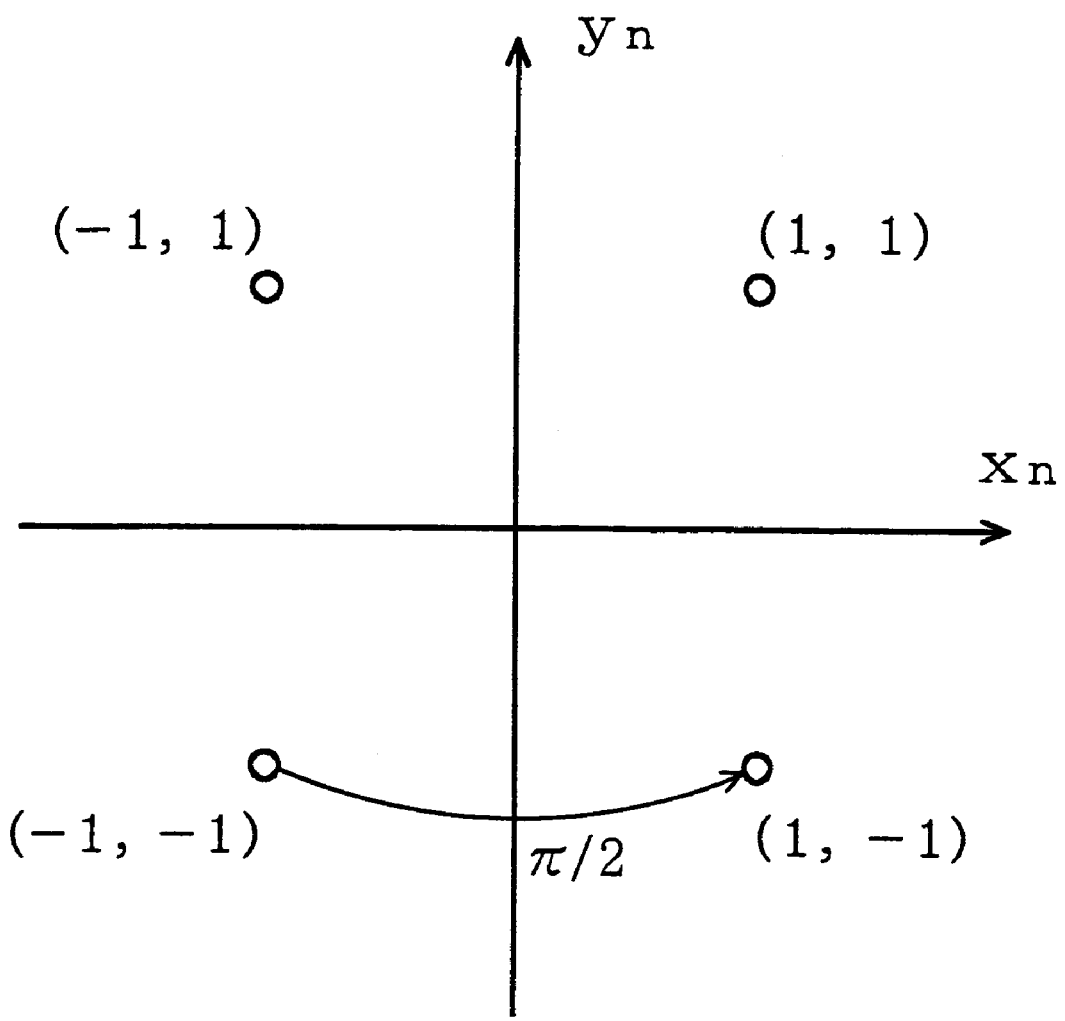
FIG. 21 is a diagram illustrating on a phase plane the scheme of the differential coding.
Figure 22:
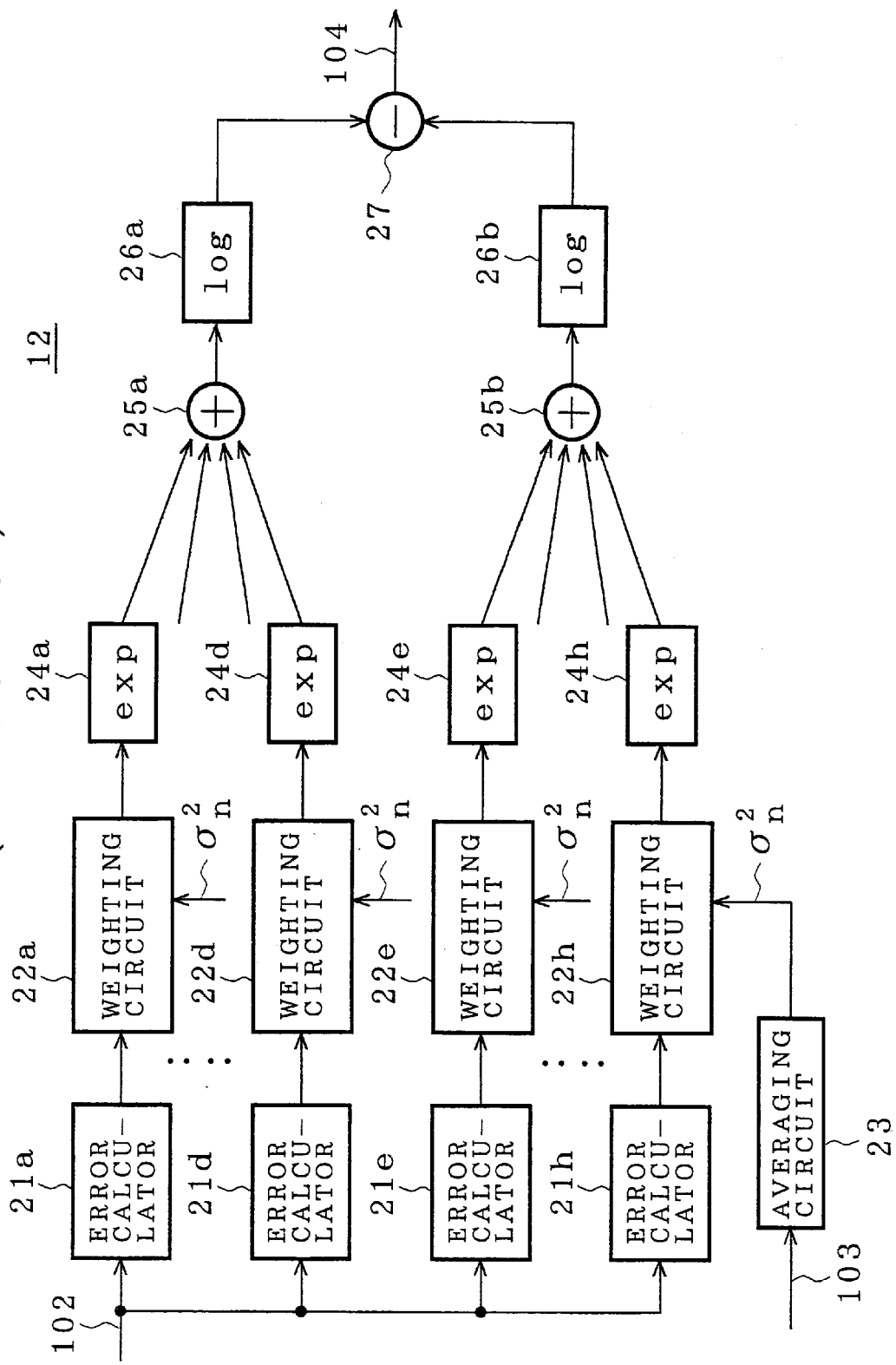
FIG. 22 is a block diagram showing the internal configuration of the reliability information generator in the conventional soft decision decoder.

FIG. 1 is a block diagram showing an embodiment 1 of a soft decision decoder in accordance with the present invention. In this figure, the reference numeral 11a designates an adaptive equalizer which outputs the soft decision data 102 after reducing the effect of the intercode interference in the base band signal 101, the received signal, and 12a designates a reliability information generator that generates reliability information 104a by carrying out delay detection of the soft decision data 102, followed by phase rotation so as to obtain data corresponding to the transmitted data components. The reference numeral 13 designates a deinterleaver which inputs the reliability information 104a from the reliability information generator 12a, and rearrange the reliability information 104a in accordance with the interleaving rule at the transmitting side, thereby outputting the deinterleaved reliability information 105. The reference numeral 14 designates a soft decision Viterbi decoder which inputs the deinterleaved reliability information 105 from the deinterleaver 13, and carries out the soft decision Viterbi decoding based on the deinterleaved reliability information 105, thereby outputting the decoded data 106. The deinterleaver 13 and the soft decision Viterbi decoder 14 are equivalent to those shown in FIG. 19 by the same reference numerals.

Next, the operation will be described.

The adaptive equalizer 11a, receiving the base band signal 101, generates the soft decision data 102 by reducing the effect of the intercede interference in the base band signal 101.

Figure 2:
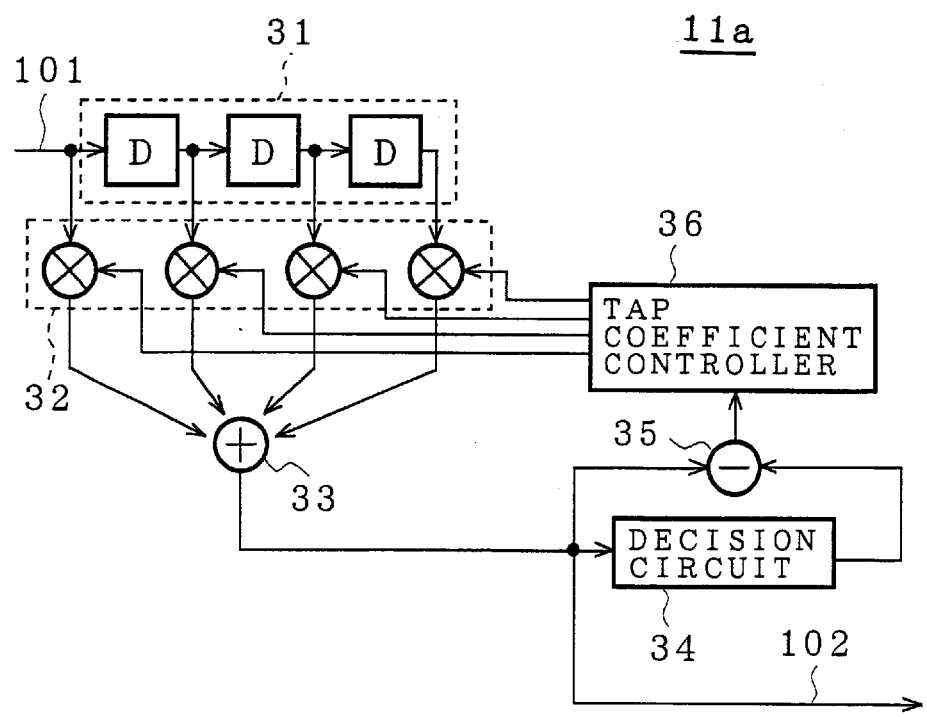
FIG. 2 is a block diagram showing an internal configuration of an adaptive equalizer in the embodiment 1.

FIG. 2 is a block diagram showing an internal configuration of the adaptive equalizer 11a. In this figure, the reference numeral 31 designates delay circuits that successively delay the input base band signal 101, and 32 designates multipliers for multiplying the outputs of the delay circuits 31 by tap coefficients from a tap coefficient controller which will be described later. The reference numeral 33 designates an adder for adding the products fed from the multipliers 32 and outputs the addition result as the soft decision data 102, 34 designates a decision circuit for carrying out the hard decision of the soft decision data 102, 35 designates a subtracter for obtaining equalized error by calculating the difference between the output of the decision circuit 34 and the soft decision data 102, and 36 designates the tap coefficient controller for controlling the tap coefficients supplied to the multipliers 32 in response to the equalized error fed from the subtracter 35.

With this arrangement, the adaptive equalizer 11a delays the input base band signal 101 with the delay circuits 31, and multiplies with the multipliers 32 the outputs from the delay circuits 31 by the tap coefficients determined by the tap coefficient controller 36. The products obtained by the multipliers 32 are added by the adder 33, and the addition result is output as the soft decision data 102. The soft decision data 102 is also fed to the decision circuit 34 to undergo the hard decision whose result is fed to the subtracter 35. The subtracter 35 obtains the equalized error by calculating the difference between the hard decision result and the soft decision data 102. The equalized error calculated by the subtracter 35 is fed to the tap coefficient controller 36 which controls the tap coefficients to be multiplied by the outputs from the delay circuits 31 by the multipliers 32 such that the effect of the intercode interference becomes as small as possible. As algorithm for controlling the tap coefficients, is usually used least mean square (abbreviated to LMS below) or recursive least squares (abbreviated to RLS below).

Thus, the adaptive equalizer 11a reduces the effect of the intercede interference in the base band signal 101 by controlling the tap coefficients with the tap coefficient controller 36. Although the adaptive equalizer 11a is shown, for simplicity, as one-dimensional circuit, two-dimensional one can be implemented by replacing respective processings in FIG. 2 with complex operation corresponding to the processings, if the base band signal 101 is two-dimensionally represented as when the transmitting side employs the QPSK modulation.

The soft decision data 102 thus generated by the adaptive equalizer 11a is fed to the reliability information generator 12a. The reliability information generator 12a carries out the delay detection of the soft decision data 102, and then rotates the phase so as to obtain data corresponding to the transmitted data components, thereby generating the reliability information 104a and delivers it to the deinterleaver 13.

FIG. 3 is a block diagram showing an internal configuration of the reliability information generator 12a. In this figure, the reference numeral 41 designates a differential detector for delay detecting the soft decision data 102 fed from the adaptive equalizer 11a, and 42 designates a phase rotator for performing the phase rotation of the output from the differential detector 41 to generate the reliability information 104a.

With this arrangement, the reliability information generator 12a carries out the delay detection of the soft decision data 102 with the differential detector 41 to output the delay detection result $DD_{out}$ expressed by the following expression (4), in which $(x_n+jy_n)$ represents the n-th soft decision data 102.

$$DD_{out}=(x_n+jy_n)\times(x_{n-1}-jy_{n-1}) \quad (4)$$

The delay detection result $DD_{out}$ output from the differential detector 41 is fed to the phase rotator 42 which phase rotates it as expressed by the following equations (5a) and (5b) so as to correspond the delay detection result $DD_{out}$ to the transmitted data components X and Y, thereby outputting the imaginary component L(X) and the real component L(Y) as the reliability information 104a. Although the phase of the delay detection result $DD_{out}$ is rotated by $5\pi/4$ in this embodiment, the value of the phase rotation depends on the differential coding rule at the transmitting side.

$$L(X) = img\left\{DD_{out} \times \left(-\frac{1}{\sqrt{2}} - j\frac{1}{\sqrt{2}}\right)\right\} \quad (5a)$$

$$L(Y) = real\left\{DD_{out} \times \left(-\frac{1}{\sqrt{2}} - j\frac{1}{\sqrt{2}}\right)\right\} \quad (5b)$$

The reliability information 104a generated by the reliability information generator 12a is delivered to the deinterleaver 13 which rearranges it in accordance with the interleaving rule at the transmitting side so that it matches the convolutionally coded data, thereby outputting the deinterleaved reliability information 105 to be supplied to the soft decision Viterbi decoder 14.

FIG. 4 is a diagram illustrating the operation of the deinterleaver 13. The deinterleaver 13 rearranges the ordering of the reliability information 104a fed from the reliability information generator 12a in accordance with the interleaving rule at the transmitting side so as to restore the convolutionally coded data, and outputs the deinterleaved reliability information 105. For example, the reliability information 104a, which corresponds to L(X) and L(Y) output from the reliability information generator 12a and is designated as $L_1$–$L_{MN}$ in FIG. 4B, is written in sequence by row as shown in FIG. 4A, to form a matrix with N rows and M columns for each slot as shown in FIG. 4B. Then, this matrix is read by column as shown in FIG. 4C to be output sequentially as the deinterleaved reliability information 105.

Although the error correcting using the convolutional coding paired with the Viterbi decoding has remarkable effect on random errors occurred on the Gaussian transmission path, it has little effect on burst errors. Thus, digital mobile communication systems, in which burst errors are most likely to occur owing to fading, usually employ the interleaving/deinterleaving to randomize the error bits, thereby increasing the error correcting power using the convolutional coding/Viterbi decoding. Incidentally, although FIGS. 4A–4C illustrate an example in which the ordering of data are changed within one slot, it can be varied such that the ordering of data over a consecutive few slots is changed, such as odd rows of FIG. 4B are assigned to the previous slot, and even rows to the present slot.

The soft decision Viterbi decoder 14, receiving the deinterleaved reliability information 105 output from the deinterleaver 13, generates the decoded data 106 by carrying out the soft decision Viterbi decoding based on the deinterleaved reliability information 105, and output its result.

Figure 5:
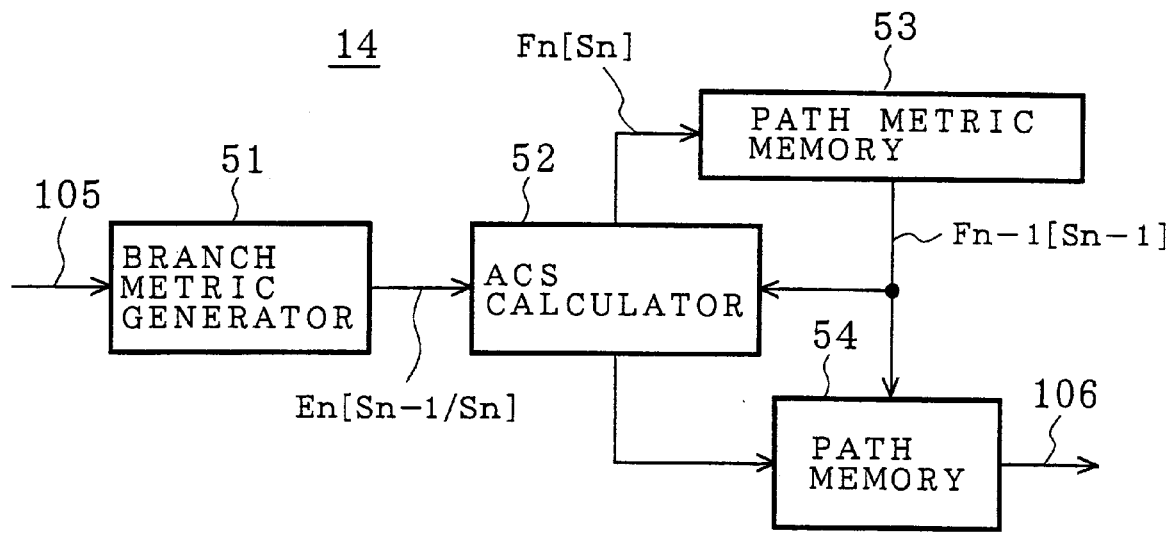
FIG. 5 is a block diagram showing an internal configuration of the soft decision Viterbi decoder in the embodiment 1.

FIG. 5 is a block diagram showing an internal configuration of the soft decision Viterbi decoder 14. In this figure, the reference numeral 51 designates a branch metric generator for generating branch metrics from the deinterleaved reliability information 105, 52 designates an ACS calculator for performing ACS operation on the branch metrics to output path metrics, 53 designates a path metric memory for storing the path metrics, and 54 designates a path memory for storing the selected paths.

In the soft decision Viterbi decoder 14 with such an arrangement, the branch metric generator 51, receiving the deinterleaved reliability information 105 from the deinterleaver 13, generates branch metrics $E_n[S_{n-1}/S_n]$ by calculating the square errors between the deinterleaved reliability information 105 and candidates of the transmitted data. The ACS calculator ACS calculator 52, receiving the branch metrics $E_n[S_{n-1}/Sn]$, performs the ACS operation which adds path metrics $F_{n-1}[S_{n-1}]$ to the branch metrics $E_n[S_{n-1}/Sn]$ and compares the added results of two branches to select one of them, and produces updated path metrics $F_n[S_n]$. The path metric memory 53 stores the path metrics $F_n[S_{n-1}]$, and supplies them, one time interval later, to the ACS calculator 52 and path memory 54 as the path metrics $F_{n-1}[S_{n-1}]$. The path selected by the ACS calculator 52 is stored in the path memory 54. The path memory 54 outputs the decoded data 106 by sequentially tracing the paths with minimum path metrics $F_{n-1}[S_{n-1}]$.

Figure 6:
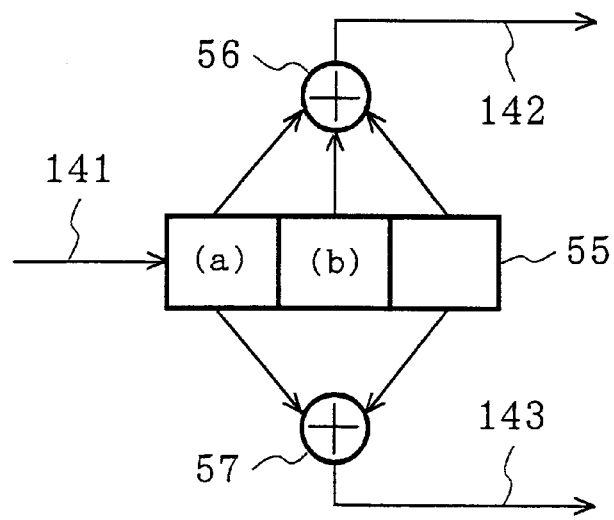
FIG. 6 is a block diagram illustrating the convolutional coding in the embodiment 1.
Figure 7:
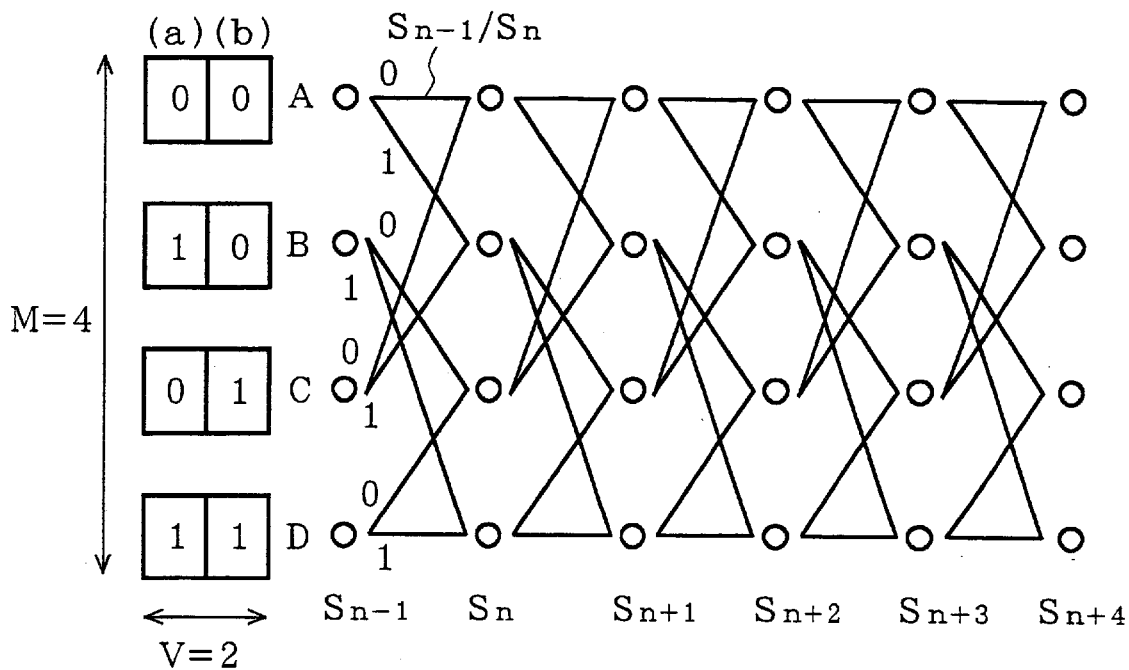
FIG. 7 is a diagram illustrating the principle of the Viterbi decoding in the embodiment 1.
Figure 8:
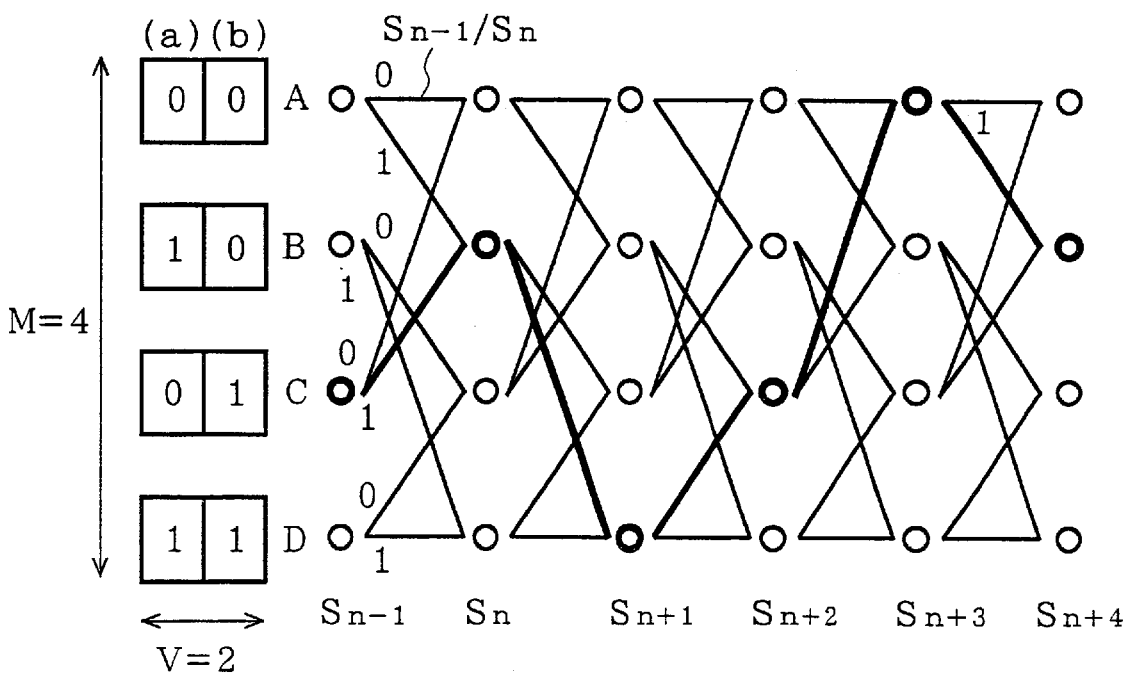
FIG. 8 is a diagram illustrating the principle of the Viterbi decoding in the embodiment 1.

Details of the generation of the branch metrics and the ACS operation will now be described. FIG. 6 is a diagram illustrating the convolutional coding, in which the reference numeral 55 designates a shift register for holding the input data 141, and 56 and 57 designate adders for carrying out mod 2 additions of data held in the shift register 55 to generate the convolutional code 142 and 143. FIGS. 7 and 8 are trellis diagrams illustrating the principle of the Viterbi decoding.

Now let us consider a simple example which outputs 2-bit convolutional code 142 and 143 for each 1-bit input data 141 as shown in FIG. 6. In this case, the coding ratio of the convolutional code is ½ since two bits are output for each one bit. In addition, let us assume that the number of the input data 141 affecting the output (called constraint length below) is three so that the output is ruled by the present and two previous input data. Thus, 1-bit input data 141 to the encoder shown in FIG. 6 will determine the state together with the previous two bit data (a) and (b) held in the shift register 55, and the state of the code is determined by the next input data for each state.

Denoting the input data at time n as $I_n$, then the states $S_n$ and $S_{n-1}$ at times n and n−1 can be represented by the following expressions (6) and (7).

$$S_n = [I_{n-V+1}, I_{n-V+2}, \ldots, I_n] \quad (6)$$

$$S_{n-1} = [I_{n-V}, I_{n-V+1}, \ldots, I_{n-1}] \quad (7)$$

where V is a value equal to the constraint length minus one.

A trellis diagram as shown in FIG. 7 can be drawn by using the feature that the (V−1) input data from $I_{n-v+1}$ to $I_{n-1}$ are common to the two states $S_n$ and $S_{n-1}$. The trellis diagram is a state transition diagram determined by the states of the encoder and the input data, which is used for representing the Viterbi decoding. In FIG. 7, if the number U of candidates of the input data is two, that is, if the input data is binary taking values 0 and 1, the number M of the states becomes $M=U^V=2^2=4$. In this case, the trellis includes four states $S_n$, 00, 10, 01 and 11, which are denoted as A, B, C and D, here.

The vertical direction of FIG. 7 indicates from top to bottom the states A, B, C and D, and the horizontal direction indicates from left to right times n−1, n, n+1, n+2, n+3, and n+4. Two lines leaving each state (open circle) represent the changes in the state with the time. For example, two line leave the state A, and enter the states A and B. The line from the state A to the next state A indicates that the input data is zero, and that the states before and after the data input are both 00. On the other hand, the line from the state A to the next state B indicates that the input data is 1, and that the state before and after the data input changes from the state 00 (A) to the state 10 (B).

A Line $S_{n-1}/S_n$ in the trellis is called a branch which is uniquely determined by the input data $I_{n-1}–I_n$, and is represented by the following expression.

$$S_{n-1}/S_n = [I_{n-V}, I_{n-V+1}, \ldots, I_n] \quad (8)$$

A bending line consisting of interconnected lines $S_V$, $S_{V+1}, \ldots, S_n$ in the trellis is called a path. The path uniquely determines the branches $S_V/S_{V+1}$, $S_{V+1}/S_{V+2}$, ..., $S_{n-1}/S_n$, and hence the transmitted sequence from $I_1$ to $I_n$. FIG. 8 illustrates the path $S_{n-1}, S_n, \ldots, S_n+4$ corresponding to the transmitted sequence $[I_{n-2}, I_{n-1}, \ldots, I_{n+4}]=[1, 0, 1, 1, 0, 0, 1]$, wherein the bold lines as a whole represent the path, bold open circles represent the states the path passes through, and the individual bold lines interconnecting the states are branches determined by the path.

Reversely, determining the path can specify the transmitted sequence. Estimation of the path is carried out at each branch by using the reliability information. The branch metrics are used for the estimation. In the soft decision Viterbi decoder 14 as shown in FIG. 5, the branch metrics are given by the square errors between the deinterleaved reliability information 105 and the candidates of the transmitted data determined in the individual branches, that is, the output of the convolutional encoder when the input data corresponding to the branches are input to the encoder. The square errors represent the possibility of the transition from one state to the next, that is, the possibility of occurrence of the branches.

The branch metrics $E_n[S_{n-1}/S_n]$ determined by the reliability information $r_n$ and the branch $S_{n-1}/S_n$ can be represented by the following expression (9).

$$E_n[S_{n-1}/S_n]=\{ABS(r_n-h_n)\}^2 \quad (9)$$

where ABS( ) represents the vector length in the Euclidean space, and $h_n$ represents the candidates of the transmitted data determined by the branches $S_{n-1}/S_n$. Equation (9) represents the square of the distance between the two points $r_n$ and $h_n$, and thus, the branch metrics $E_n[S_{n-1}/S_n]$ are uniquely determined by the branches $S_{n-1}/S_n$.

The sum total, along the path, of the branch metrics which are uniquely determined for individual branches is called a path metric. There are U paths (two paths in FIG. 7) for each state, and a path with a minimum path metric among the U paths is called a survivor path. The survivor path is present for each state, and is obtained by the ACS operation by the ACS calculator 52 shown in FIG. 5.

The addition in the ACS operation is to add the survivor path metric $F_{n-1}[S_{n-1}]$ corresponding to the one time interval previous state $S_{n-1}$ to the branch metric $E_n[S_{n-1}/S_n]$ as shown by the following expression (10).

$$F_n[S_{n-1}/S_n]=E_n[S_{n-1}/S_n]+F_{n-1}[S_{n-1}] \quad (10)$$

where $F_n[S_n]$ represents the survivor path metric corresponding to the state $S_n$, and the $F_n[S_{n-1}/S_n]$ represents the path metric corresponding to the branch $S_{n-1}/S_n$.

In the Viterbi decoder as a whole, M×U path metrics are generated because each of the M states has U branches. The comparing operation in the ACS operation is to compare the U path metrics generated in each state, and the selecting operation is to select the minimum path metric based on the result of the comparison, thereby selecting the survivor path of the present time interval corresponding to the selected path metric.

Thus, the branch metric generation and the ACS operation are carried out. The Viterbi decoder inputs the reliability information for each symbol, and performs the successive ACS operation for respective states. After inputting the entire reliability information, the final survivor path which has the minimum path metric is determined as the maximum likelihood path, and the sequence which is uniquely determined by the maximum likelihood path is decided as the transmitted sequence.

According to the embodiment 1, the soft decision Viterbi decoding using the reliability information 104a obtained by the foregoing processing enables the characteristics after the Viterbi decoding to be improved as compared with the hard decision Viterbi decoding. Furthermore, although the embodiment 1 would be inferior to the conventional soft decision decoder in its characteristic, it has an advantage that the amount of calculation or hardware needed for generating the reliability information 104a can be reduced because the calculation involving exponential (exp) or logarithmic (log) functions are obviated.

Embodiment 2

Figure 9:
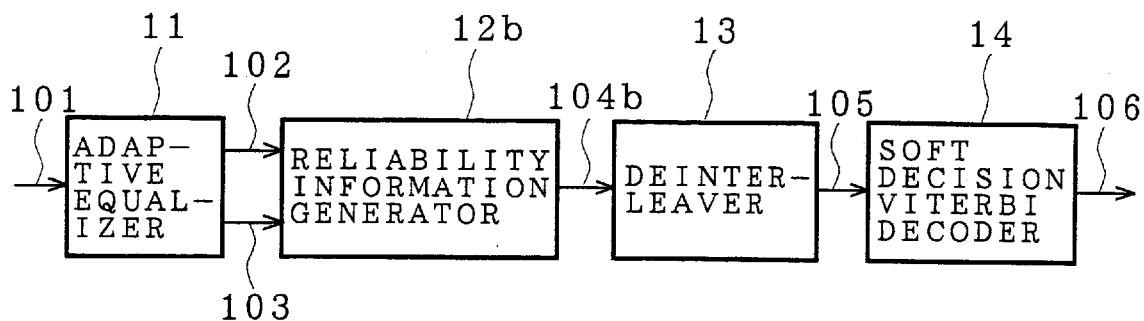
FIG. 9 is a block diagram showing an embodiment 2 of the soft decision decoder in accordance with the present invention.

FIG. 9 is a block diagram showing the configuration of an embodiment 2 of a soft decision decoder in accordance with the present invention. The present embodiment 2 of the soft decision decoder differs from the embodiment 1 in that the adaptive equalizer 11 outputs equalized square error 103 besides the soft decision data 102, and that the reliability information generator 12b generates the reliability information 104b from the soft decision data 102 and the equalized square error 103.

The adaptive equalizer 11, receiving the base band signal 101, operates such that the equalized square error 103 becomes as small as possible to reduce the influence of the intercode interference in the base band signal 101, and generates the soft decision data 102 and equalized square error 103.

Figure 10:
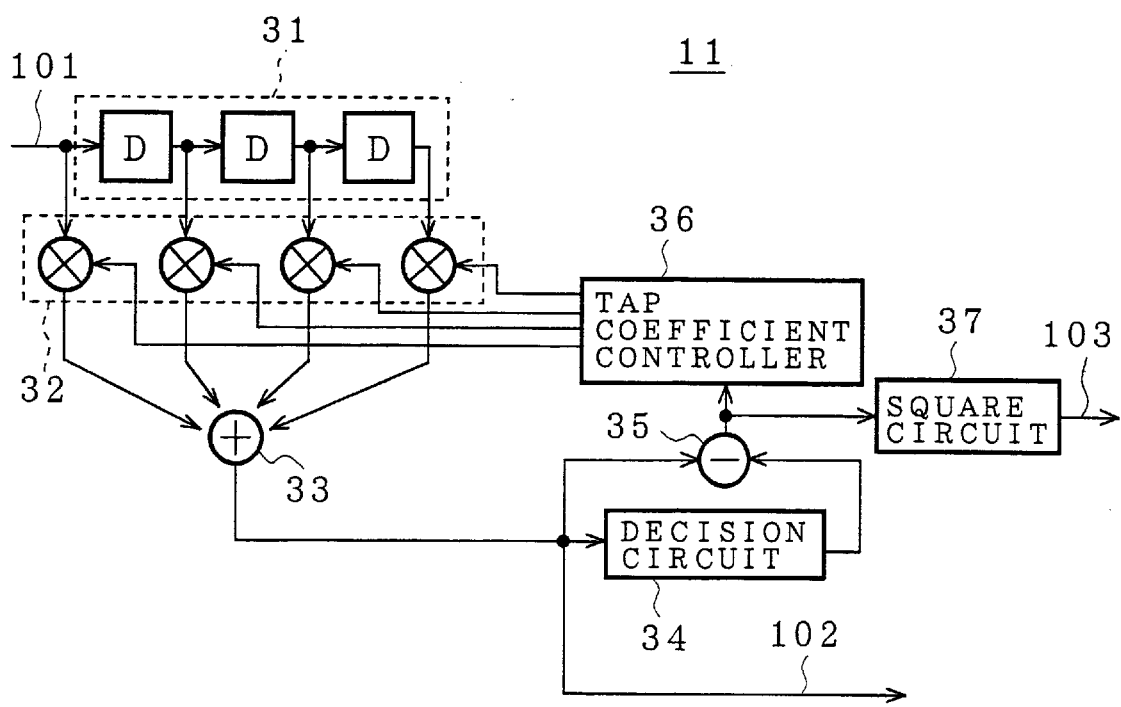
FIG. 10 is a block diagram showing an internal configuration of an adaptive equalizer in the embodiment 2.

FIG. 10 is a block diagram showing an internal configuration of the adaptive equalizer 11, in which corresponding portions to those in FIG. 2 are designated by the same reference numerals, and the description thereof is omitted here. In this figure, the reference numeral 37 designates a square circuit that squares the equalized error fed from the subtracter 35 to the tap coefficient controller 36, and supplies the result to the reliability information generator 12b of FIG. 9 as the equalized square error 103.

With this arrangement, the adaptive equalizer 11, as in the embodiment 1, delays the input base band signal 101 with the delay circuits 31, and multiplies with the multipliers 32 the outputs from the delay circuits 31 by the tap coefficients from the tap coefficient controller 36. The products obtained by the multipliers 32 are added by the adder 33 to generate the soft decision data 102. The soft decision data 102 undergoes the hard decision by the decision circuit 34, and the subtracter 35 calculates the equalized error from the hard decision result and the soft decision data 102. The equalized error calculated is fed to the square circuit 37 which squares it to be output as the equalized square error 103. The equalized error output from the subtracter 35 is also input to the tap coefficient controller 36 which controls the tap coefficients to be multiplied by the outputs from the delay circuits 31 by the multipliers 32 such that the equalized square error 103 becomes as small as possible by using the LMS or RLS algorithm.

Thus, the adaptive equalizer 11 reduces the effect of the intercode interference in the base band signal 101 by controlling the tap coefficients such that the equalized square error 103 becomes as small as possible. Although the adaptive equalizer 11 is shown, for simplicity, as one-dimensional circuit in FIG. 10, two-dimensional one can be implemented by replacing respective processings in FIG. 10 with complex operation corresponding to the processings, if the base band signal 101 is two-dimensionally represented as when the transmitting side employs the QPSK modulation, as in the embodiment 1.

The soft decision data 102 and the equalized square error 103 thus generated by the adaptive equalizer 11 is fed to the reliability information generator 12b. The reliability information generator 12b carries out the delay detection of the soft decision data 102, followed by the rotation of its phase so as to match the transmitted data components, and weights the result with the average value of the equalized square error 103, thereby generating the reliability information 104b and delivers it to the deinterleaver 13.

Figure 11:
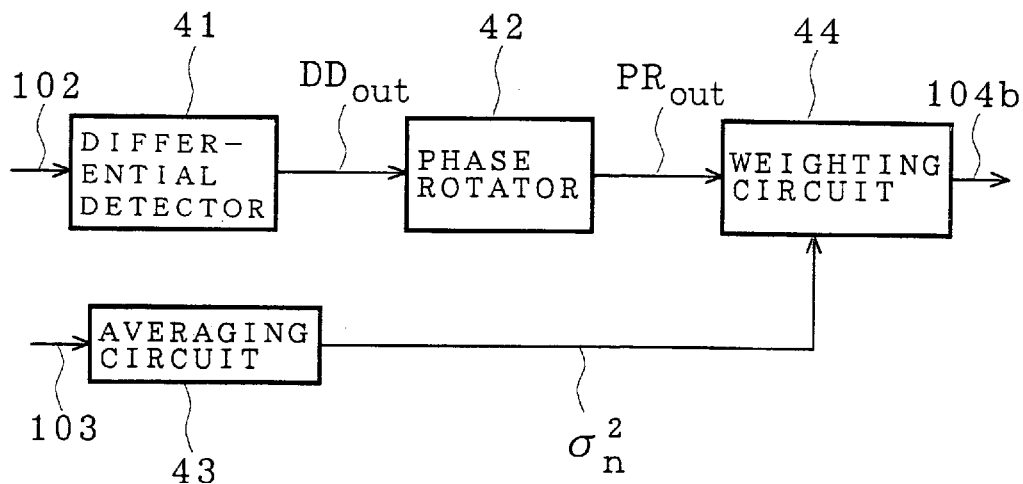
FIG. 11 is a block diagram showing an internal configuration of the reliability information generator in the embodiment 2.

FIG. 11 is a block diagram showing an internal configuration of the reliability information generator 12b, in which corresponding portions to those in FIG. 3 are designated by the same reference numerals, and the description thereof is omitted here. In this figure, the reference numeral 43 designates an averaging circuit that obtains the average value of the equalized square error 103 fed from the adaptive equalizer 11, and 44 designates a weighting circuit that weights the output from the phase rotator 42 with the output from the averaging circuit 43 to generate the reliability information 104b, thereby supplying it to the deinterleaver 13 in FIG. 9.

With this arrangement, the reliability information generator 12b, as in the embodiment 1, carries out the delay detection of the soft decision data 102 with the differential detector 41 to output the delay detection result $DD_{out}$ expressed by the foregoing expression (4). The delay detection result $DD_{out}$ output from the differential detector 41 is fed to the phase rotator 42 which rotates its phase by $5\pi/4$ so as to match the delay detection result $DD_{out}$ with the X and Y components of the transmitted data, thereby outputting $PR_{out}$ as expressed by the following equation (11).

$$PR_{out} = DD_{out} \times \left(-\frac{1}{\sqrt{2}} - j\frac{1}{\sqrt{2}}\right) \qquad (11)$$

On the other hand, the averaging circuit 43 averages the equalized square error 103 fed from the adaptive equalizer 11 over $N\omega$ symbols to generate the average value $\sigma_n^2$ of the equalized square error 103 expressed by the foregoing equation (3), and supplies it to the weighting circuit 44. The weighting circuit 44 outputs the weighted values L(X) and L(Y) as the reliability information 104b by dividing the imaginary part and real part of the $PR_{out}$ output from the phase rotator 42 by the average value $\sigma_n^2$ of the equalized square error 103, as expressed by the following equations (12a) and (12b).

$$L(X) = \frac{img(PR_{out})}{\sigma_n^2} \qquad (12a)$$

$$L(Y) = \frac{real(PR_{out})}{\sigma_n^2} \qquad (12b)$$

The reliability information 104b generated by the reliability information generator 12b is delivered to the deinterleaver 13 which rearranges it in accordance with the interleaving rule at the transmitting side as in the embodiment 1, and outputs it as the deinterleaved reliability information 105 to be supplied to the soft decision Viterbi decoder 14. The soft decision Viterbi decoder 14 carries out the soft decision Viterbi decoding based on the deinterleaved reliability information 105, and generates the decoded data 106 to be output.

The adaptive equalizer 11 operates such that the difference between the soft decision data 102 and the hard decision result becomes as small as possible by increasing the tap coefficients if the level of the received signal falls owing to fading on the transmission path. Accordingly, if the reliability information 104a is obtained by the delay detection of the soft decision data 102 as in the embodiment 1, the degradation in the state of the transmission path may not be reflected on the reliability information of individual symbols. The present embodiment 2, taking account of this, weights the equalized square error 103 with the average value $\sigma_n^2$ as expressed by equations (12a) and (12b). As the state of the transmission path degrades, the average value $\sigma_n^2$ of the equalized square error 103 increases, and hence the values L(X) and L(Y) of the reliability information 104b reduce. This will improve the characteristic after the Viterbi decoding of the data transmitted through the fading transmission path as compared with the embodiment 1.

Embodiment 3

Figure 12:
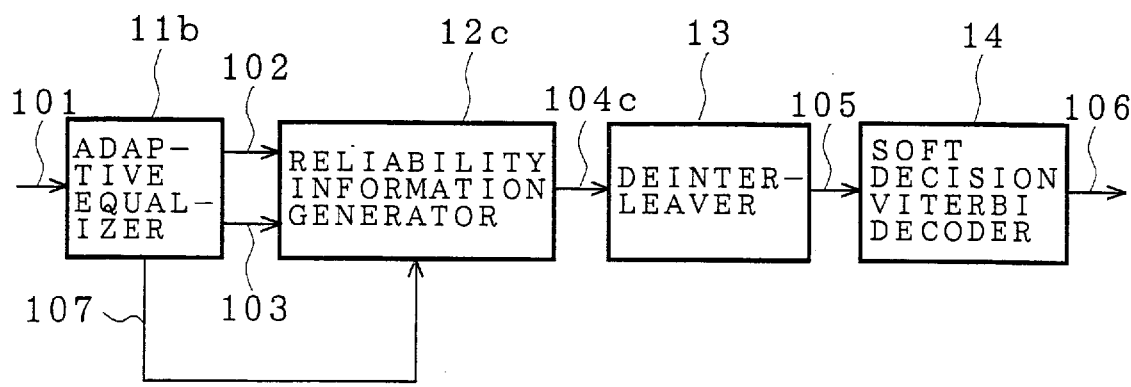
FIG. 12 is a block diagram showing an embodiment 3 of the soft decision decoder in accordance with the present invention.

FIG. 12 is a block diagram showing an embodiment 3 of a soft decision decoder in accordance with the present invention. The present embodiment 3 of the soft decision decoder differs from the foregoing embodiment 2 in that the adaptive equalizer 11b outputs tap coefficients 107 besides the soft decision data 102 and the equalized square error 103, and that a reliability information generator 12c generates reliability information 104c from the soft decision data 102, the equalized square error 103 and the tap coefficients 107.

The operation will now be described.

The adaptive equalizer 11b, receiving the base band signal 101, operates such that the equalized square error 103 becomes as small as possible to reduce the effect of the intercode interference in the base band signal 101, generates the soft decision data 102 and equalized square error 103, and produces the tap coefficients 107 obtained in the process.

Figure 13:
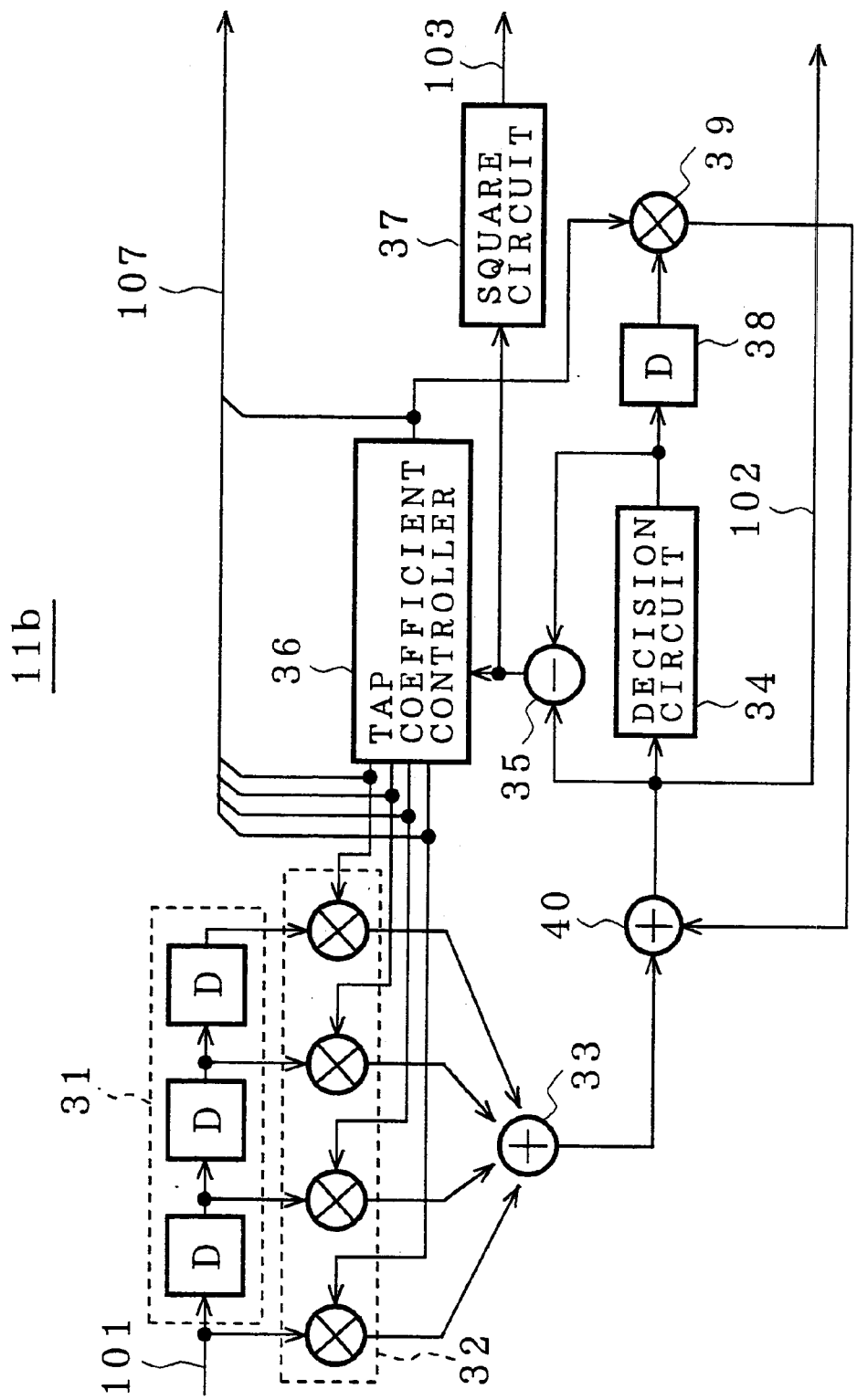
FIG. 13 is a block diagram showing an internal configuration of an adaptive equalizer in the embodiment 3.

FIG. 13 is a block diagram showing an internal configuration of the adaptive equalizer 11b, in which corresponding portions to those of FIG. 10 in the embodiment 2 are designated by the same reference numerals, and the description thereof is omitted here. In this figure, the reference numeral 38 designates a delay circuit that delays the output of the decision circuit 34, 39 designates a multiplier that multiplies the output from the delay circuit 38 by a tap coefficient fed from the tap coefficient controller 36, and 40 designates an adder that adds the output from the multiplier 39 to the output from the adder 33 to generate the soft decision data 102. The adaptive equalizer 11b differs from the adaptive equalizer 11 of the embodiment 2 as shown in FIG. 10 in that it is provided with the delay circuit 38, multiplier 39 and the adder 40 to feed back the hard decision result of the soft decision data 102, and that it supplies the tap coefficients to the multiplier 39 as well as to the multipliers 32. In FIG. 13, a part consisting of the delay circuits 31, multipliers 32 and adder 33, which does not constitute a feedback loop, is called a feedforward portion, and a part consisting of the delay circuit 38 and multiplier 39, which feeds back the hard decision result, is called a feedback portion.

With this arrangement, the adaptive equalizer 11b, as in the embodiment 2, delays the input base band signal 101 with the delay circuits 31, and multiplies with the multipliers 32 the outputs from the delay circuits 31 by the tap coefficients from the tap coefficient controller 36. The products obtained by the multipliers 32 are summed up by the adder 33. The subtracter 35 calculates the equalized error from the soft decision data 102 and the hard decision result of the soft decision data 102 by the decision circuit 34. The tap coefficient controller 36 controls the tap coefficients on the basis of the equalized error, and the square circuit 37 squares the equalized error to output its result as the equalized square error 103. The tap coefficients 107 generated by the tap coefficient controller 36 are supplied not only to the multipliers 32 and 39, but also to the reliability information generator 12c shown in FIG. 12. The hard decision result by the decision circuit 34 is delayed by the delay circuit 38, and then multiplied by the tap coefficient from the tap coefficient controller 36 by the multiplier 39. The output of the feedback portion and the output of the feedforward portion are added by the adder 40, to be supplied to the reliability information generator 12c, decision circuit 34 and subtracter 35 as the soft decision data 102. The adaptive equalizer 11b thus arranged to feedback the hard decision result has an advantage of achieving a good characteristic even when delay times of delay waves are large on the fading transmission path.

The soft decision data 102, the equalized square error 103 and the tap coefficients 107 thus generated by the adaptive equalizer 11b are fed to the reliability information generator 12c. The reliability information generator 12c carries out the delay detection of the soft decision data 102, followed by the rotation of its phase so as to match the transmitted data components, and weights the result with the average value of the equalized square error 103 and the detection result of divergence of algorithm of the adaptive equalizer 11b based on the tap coefficients 107, thereby generating the reliability information 104c and delivers it to the deinterleaver 13.

Figure 14:
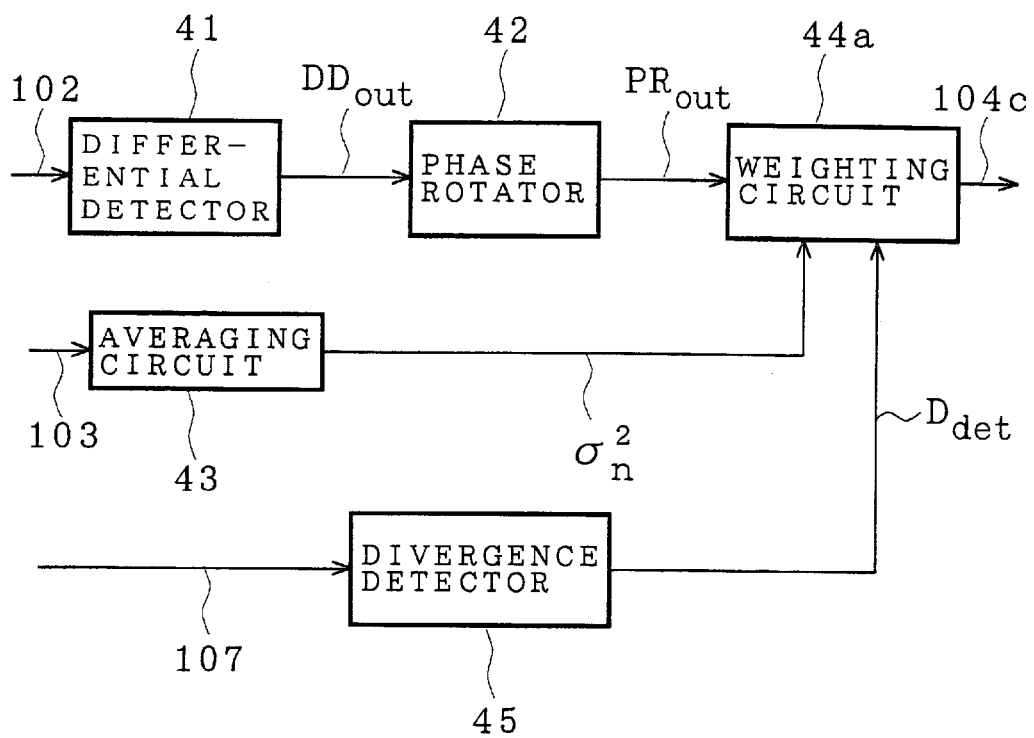
FIG. 14 is a block diagram showing an internal configuration of the reliability information generator in the embodiment 3.

FIG. 14 is a block diagram showing an internal configuration of the reliability information generator 12c, in which corresponding portions to those in FIG. 11 are designated by the same reference numerals, and the description thereof is omitted here. In this figure, the reference numeral 45 designates a divergence detector for detecting from the tap coefficients 107 fed from the adaptive equalizer 11b the divergence of the algorithm of the adaptive equalizer 11b shown in FIG. 12, and 44a designates a weighting circuit that weights the output from the phase rotator 42 with the average value of the equalized square error 103 output from the averaging circuit 43 and the detection result output from the divergence detector 45, to generate the reliability information 104c, thereby supplying it to the deinterleaver 13 in FIG. 12.

With this arrangement, the reliability information generator 12c, as in the embodiment 2, carries out the delay detection of the soft decision data 102 with the differential detector 41 to output the delay detection result $DD_{out}$ expressed by the foregoing expression (4). The delay detection result $DD_{out}$ is fed to the phase rotator 42 which rotates its phase by $5\pi/4$ so as to match the delay detection result $DD_{out}$ with the X and Y components of the transmitted data, thereby outputting $PR_{out}$ as expressed by the foregoing equation (11). On the other hand, the averaging circuit 43 averages the equalized square error 103 fed from the adaptive equalizer 11 over $N\omega$ symbols to generate the average value $\sigma_n^2$ of the equalized square error 103 expressed by the foregoing equation (3).

The divergence detector 45 detects the divergence of the algorithm of the adaptive equalizer 11b shown in FIG. 12 by using the tap coefficients 107, and outputs its result as the divergence detection signal $D_{det}$. To be more specific, the divergence can be detected by comparing the tap coefficients 107 with a predetermined threshold value because the tap coefficients of the feedforward portion take a value close to zero and the tap coefficients of the feedback portion take a value close to unity. The weighting circuit 44a, receiving the average value $\sigma_n^2$ of the equalized square error 103 and the divergence detection signal $D_{det}$, outputs as the reliability information 104c the values L(X) and L(Y) which are obtained by weighting the imaginary part and real part of the $PR_{out}$ output from the phase rotator 42 with the average value $\sigma_n^2$ of the equalized square error 103 and the divergence detection signal $D_{det}$ as expressed by the following expressions (13a) and (13b). In expressions (13a) and (13b), it is assumed that the divergence detector 45 outputs the divergence detection signal $D_{det}$ of "1" when it detects the divergence, whereas it outputs $D_{det}$ of "0" when it does not detect the divergence.

$$L(X) = \begin{cases} \frac{img(PR_{out})}{\sigma_n^2} & (D_{det} = 0) \\ 0 & (D_{det} = 1) \end{cases} \quad (13a)$$

$$L(Y) = \begin{cases} \frac{real(PR_{out})}{\sigma_n^2} & (D_{det} = 0) \\ 0 & (D_{det} = 1) \end{cases} \quad (13b)$$

When the adaptive equalizer 11b includes a feedback loop for feeding back the hard decision result of the soft decision data 102 as shown in FIG. 13, it will output random soft decision data 102 independent of the transmitted data if the algorithm of the adaptive equalizer 11b diverges. In this case, the reliability information generator 12c will produce the reliability information 104c indicating high reliability even though the actual reliability is low, if the reliability information 104c is obtained in the same manner as in the embodiment 2, because the equalized square error 103 takes a small value owing to a small difference between the soft decision data 102 and the hard decision result. The present embodiment 3, taking account of this, detects the divergence of the algorithm of the adaptive equalizer 11b from the tap coefficients 107 of the adaptive equalizer 11b to reduce the reliability indicated by the reliability information 104c when the algorithm diverges. This will improve the characteristic after the Viterbi decoding as compared with the embodiment 2.

Embodiment 4

Figure 15:
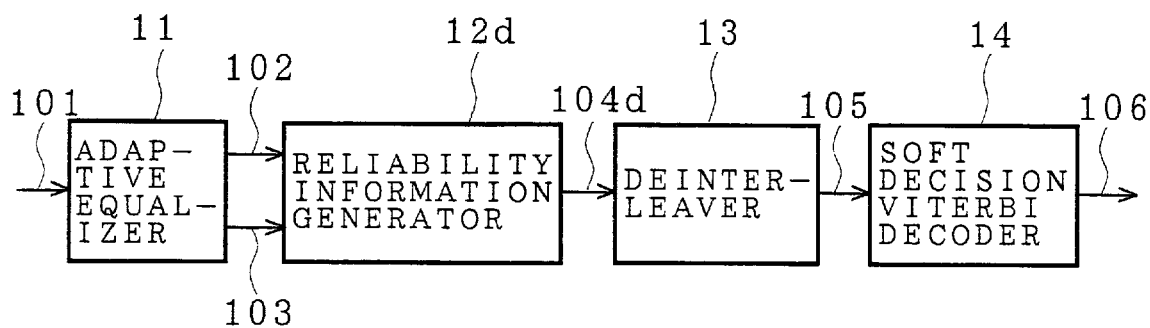
FIG. 15 is a block diagram showing an embodiment 4 of the soft decision decoder in accordance with the present invention.

FIG. 15 is a block diagram showing the configuration of an embodiment 4 of a soft decision decoder in accordance with the present invention. The present embodiment 4 of the soft decision decoder differs from the embodiment 2 in the configuration of a reliability information generator 12d.

This will be described in more detail.

The adaptive equalizer 11, receiving the base band signal 101, operates, as in the embodiment 2, such that the equalized square error 103 becomes as small as possible to reduce the effect of the intercode interference in the base band signal 101, and generates the soft decision data 102 and equalized square error 103. The soft decision data 102 and the equalized square error 103 are input to the reliability information generator 12d which obtains the minimum value of the differences between the soft decision data 102 and the patterns corresponding to the transmitted data of "1", and the minimum value of the differences between the soft decision data 102 and the patterns corresponding to the transmitted data of "0", and weights the difference between the two minimum values with the average value of the equalized square error 103, thereby generating the reliability information 104d for the soft decision Viterbi decoding.

Figure 16:
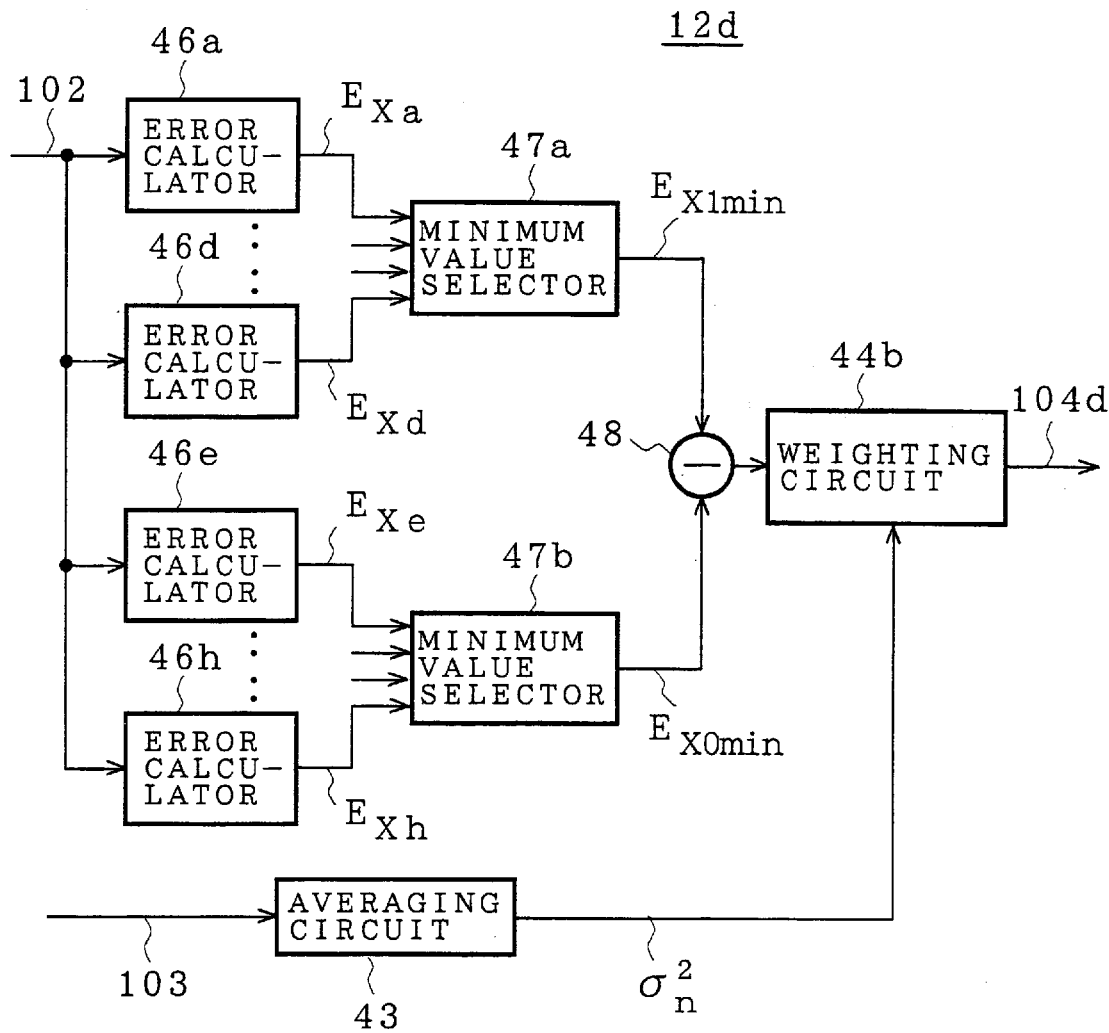
FIG. 16 is a block diagram showing an internal configuration of the reliability information generator in the embodiment 4.

FIG. 16 is a block diagram showing the internal configuration of the reliability information generator 12d. In this figure, the reference numerals 46a–46d designate error calculators for calculating errors $E_{Xa}$–$E_{Xd}$ (or $E_{Ya}$–$E_{Yd}$) between the soft decision data 102 fed from the adaptive equalizer 11 and the patterns associated with the transmitted data X (or Y) of "1", and 46e–46h designate error calculators for calculating errors $E_{Xe}$–$E_{Xh}$ (or $E_{Ye}$–$E_{Yh}$) between the soft decision data 102 and the patterns associated with the transmitted data X (or Y) of "0". The reference numeral 47a designates a minimum value selector for selecting a minimum value $E_{X1min}$ (or $E_{Y1min}$) of the errors $E_{Xa}$–$E_{Xd}$ (or $E_{Ya}$–$E_{Yd}$) calculated by the error calculators 46a–46d, and 47b designates a minimum value selector for selecting a minimum value $E_{X0min}$ (or $E_{Y0min}$) of the errors $E_{Xe}$–$E_{Xh}$ (or $E_{Ye}$–$E_{Yh}$) calculated by the error calculators 46e–46h. The reference numeral 48 designates a subtracter for obtaining the difference between the minimum values $E_{X1min}$ (or $E_{Y1min}$) and $E_{X0min}$ (or $E_{Y0min}$) output from the minimum value selectors 47a and 47b. The reference numeral 43 designates an averaging circuit for obtaining the average value $\sigma_n^2$ of the equalized square error 103 fed from the adaptive equalizer 11, and 44b designates a weighting circuit for weighting the output from the subtracter 48 with the average value $\sigma_n^2$ of the equalized square error 103 fed from the averaging circuit 43, thereby generating the reliability information 104d.

In the reliability information generator 12d with this arrangement, the error calculators 46a–46d calculate the errors $E_{Xa}$–$E_{Xd}$, and the error calculators 46e–46h calculate the errors $E_{Xe}$–$E_{Xh}$, respectively.

There are four patterns associated with the transmitted data of "1" in the differential coding rule table as shown in FIG. 20, for example. They occur when $(x^-_n, y^-_n)$ is $(1, 1)$ and $x^-_{n-1}$ is $-1$, when $(x^-_n, y^-_n)$ is $(1, -1)$ and $y^-_{n-1}$ is 1, when $(x^-_n, y^-_n)$ is $(-1, -1)$ and $x^-_{n-1}$ is 1, and when $(x^-_n, y^-_n)$ is $(-1, 1)$ and $y^-_{n-1}$ is $-1$, which correspond to the right half of the signal points of the current symbol in FIG. 20. Likewise, there are four patterns associated with the transmitted data of "0". They occur when $(x^-_n, y^-_n)$ is $(-1, -1)$ and $x^-_{n-1}$ is $-1$, when $(x^-_n, y^-_n)$ is $(-1, 1)$ and $y^-_{n-1}$ is 1, when $(x^-_n, y^-_n)$ is $(1, 1)$ and $x^-_{n-1}$ is 1, and when $(x^-_n, y^-_n)$ is $(1, -1)$ and $y^-_{n-1}$ is $-1$, which correspond to the left half of the signal points of the current symbol in FIG. 20.

The error calculators 46a–46d calculate the errors $E_{Xa}$–$E_{Xd}$ between the soft decision data 102 and the four patterns associated with the transmitted data X of "1" using the following expressions (14a), and the error calculators 46e–46h calculate the errors $E_{Xe}$–$E_{Xh}$ between the soft decision data 102 and the four patterns associated with the transmitted data X of "0" using the following expressions (14b).

$$E_{Xa} = [(x_n - 1)^2 + (y_n - 1)^2 + (x_{n-1} + 1)^2] \quad (14a)$$
$$E_{Xb} = [(x_n - 1)^2 + (y_n + 1)^2 + (y_{n-1} - 1)^2]$$
$$E_{Xc} = [(x_n + 1)^2 + (y_n + 1)^2 + (x_{n-1} - 1)^2]$$
$$E_{Xd} = [(x_n + 1)^2 + (y_n - 1)^2 + (y_{n-1} + 1)^2]$$

$$E_{Xe} = [(x_n - 1)^2 + (y_n - 1)^2 + (x_{n-1} - 1)^2] \quad (14b)$$
$$E_{Xf} = [(x_n - 1)^2 + (y_n + 1)^2 + (y_{n-1} + 1)^2]$$
$$E_{Xg} = [(x_n + 1)^2 + (y_n + 1)^2 + (x_{n-1} + 1)^2]$$
$$E_{Xh} = [(x_n + 1)^2 + (y_n - 1)^2 + (y_{n-1} - 1)^2]$$

The errors $E_{Xa}$–$E_{Xd}$ calculated by the error calculators 46a–46d are supplied to the minimum value selector 47a, and the errors $E_{Xe}$–$E_{Xh}$ calculated by the error calculators 46e–46h are supplied to the minimum value selector 47b. The minimum value selectors 47a and 47b select the minimum value $E_{X1min}$ of the errors $E_{Xa}$–$E_{Xd}$ and the minimum value $E_{X0min}$ of the errors $E_{Xe}$–$E_{Xh}$, respectively, as shown by expressions (15a), and output them.

$$E_{X1min} = \min\{E_{Xa}, E_{Xb}, E_{Xc}, E_{Xd}\} \quad (15a)$$
$$E_{X0min} = \min\{E_{Xe}, E_{Xf}, E_{Xg}, E_{Xh}\}$$

The averaging circuit 43, receiving the equalized square error 103 from the adaptive equalizer 11, averages the equalized square error 103 over the $N\omega$ symbols as shown in the foregoing expression (3) to obtain the average value $\sigma_n^2$ of the equalized square error 103, and supplies the result to the weighting circuit 44b. On the other hand, the subtracter 48 obtains the difference between the minimum values $E_{X1min}$ and $E_{X0min}$ output from the minimum value selectors 47a and 47b, and supplies the difference to the weighting circuit 44b. The weighting circuit 44b weights the output of the subtracter 48 by dividing it by the average value $\sigma_n^2$ of the equalized square error 103 fed from the averaging circuit 43 as expressed by the following equation (16a), and supplies the resultant L(X) to the deinterleaver 13 as the reliability information 104d.

$$L(X) = \frac{(E_{X1min} - E_{X0min})}{-2\sigma_n^2} \quad (16a)$$

With regard to the transmitted data Y, the error calculators 46a–46d and the error calculators 46e–46h calculate the errors $E_{Ya}$–$E_{Yd}$ and $E_{Ye}$–$E_{Yh}$ between the soft decision data 102 and the patterns associated with the transmitted data of "1" and "0" using the following expressions (14c) and (14d), respectively, and the minimum value selectors 47a and 47b select the minimum values $E_{Y1min}$ and $E_{Y0min}$ of the errors $E_{Ya}$–$E_{Yd}$ and $E_{Ye}$–$E_{Yh}$, respectively, as shown by the expression (15b).

$$E_{Ya} = [(x_n - 1)^2 + (y_n - 1)^2 + (y_{n-1} + 1)^2] \quad (14c)$$
$$E_{Yb} = [(x_n - 1)^2 + (y_n + 1)^2 + (x_{n-1} + 1)^2]$$
$$E_{Yc} = [(x_n + 1)^2 + (y_n + 1)^2 + (y_{n-1} - 1)^2]$$
$$E_{Yd} = [(x_n + 1)^2 + (y_n - 1)^2 + (x_{n-1} - 1)^2]$$

$$E_{Ye} = [(x_n - 1)^2 + (y_n - 1)^2 + (y_{n-1} - 1)^2] \quad (14d)$$
$$E_{Yf} = [(x_n - 1)^2 + (y_n + 1)^2 + (x_{n-1} - 1)^2]$$
$$E_{Yg} = [(x_n + 1)^2 + (y_n + 1)^2 + (y_{n-1} + 1)^2]$$
$$E_{Yh} = [(x_n + 1)^2 + (y_n - 1)^2 + (x_{n-1} + 1)^2]$$

$$E_{Y1min} = \min\{E_{Ya}, E_{Yb}, E_{Yc}, E_{Yd}\} \quad (15b)$$
$$E_{Y0min} = \min\{E_{Ye}, E_{Yf}, E_{Yg}, E_{Yh}\}$$

Subsequently, the subtracter 48 obtains the difference between the minimum values $E_{Y1min}$ and $E_{Y0min}$ of the errors. Then the weighting circuit 44b weights the output of the subtracter 48 by dividing it by the average value $\sigma_n^2$ of the equalized square error 103 as expressed by the following equation (16b), and supplies the resultant L(Y) to the deinterleaver 13 as the reliability information 104d.

$$L(Y) = \frac{(E_{Y1min} - E_{Y0min})}{-2\sigma_n^2} \quad (16b)$$

The foregoing processing corresponds to the case where only the maximum one is used of the four exponential (exp) terms in equations (2a) and (2b) for calculating the reliability information 104 in the conventional soft decision decoder, and achieves characteristic equivalent to that of the conventional soft decision decoder. In addition, since the embodiment 4 of the soft decision decoder does not perform the exponential (exp) or logarithm (log) operations, it can reduce the amount of calculations or hardware scale needed for generating the reliability information 104 as compared with the conventional soft decision decoder.

Embodiment 5

Figure 17:
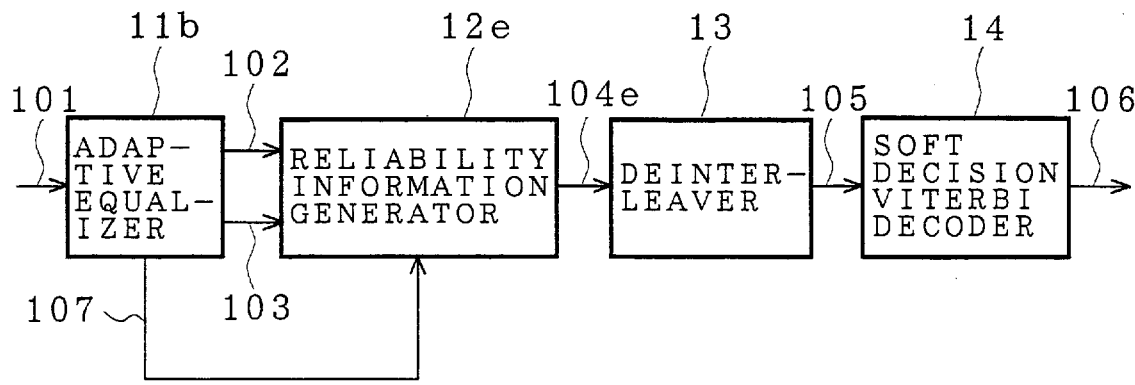
FIG. 17 is a block diagram showing an embodiment 5 of the soft decision decoder in accordance with the present invention.

FIG. 17 is a block diagram showing an embodiment 5 of the soft decision decoder in accordance with the present invention. The present embodiment 5 differs from the soft decision decoder of the embodiment 4 in that it carries out the weighting of the difference between the minimum values obtained between the soft decision data 102 and the patterns associated with the transmitted data of "1" and "0", on the basis of the equalized square error 103 and the divergence detection result of the algorithm of the adaptive equalizer 11b which is detected from the tap coefficients 107.

This will be described in more detail.

The adaptive equalizer 11b, receiving the base band signal 101, operates, as in the embodiment 3, such that the equalized square error 103 becomes as small as possible to reduce the effect of the intercode interference in the base band signal 101, and generates the soft decision data 102, equalized square error 103 and tap coefficients 107 obtained in the process. The soft decision data 102, the equalized square error 103 and tap coefficients 107 are input to the reliability information generator 12e which obtains the minimum value of the errors between the soft decision data 102 and the patterns associated with the transmitted data of "1", and the minimum value of the errors between the soft decision data 102 and the patterns associated with the transmitted data of "0", and weights the difference between the two minimum values with the average value of the equalized square error 103 and the detection result of the divergence of the algorithm of the adaptive equalizer 11b based on the tap coefficients 107, thereby generating the reliability information 104e.

Figure 18:
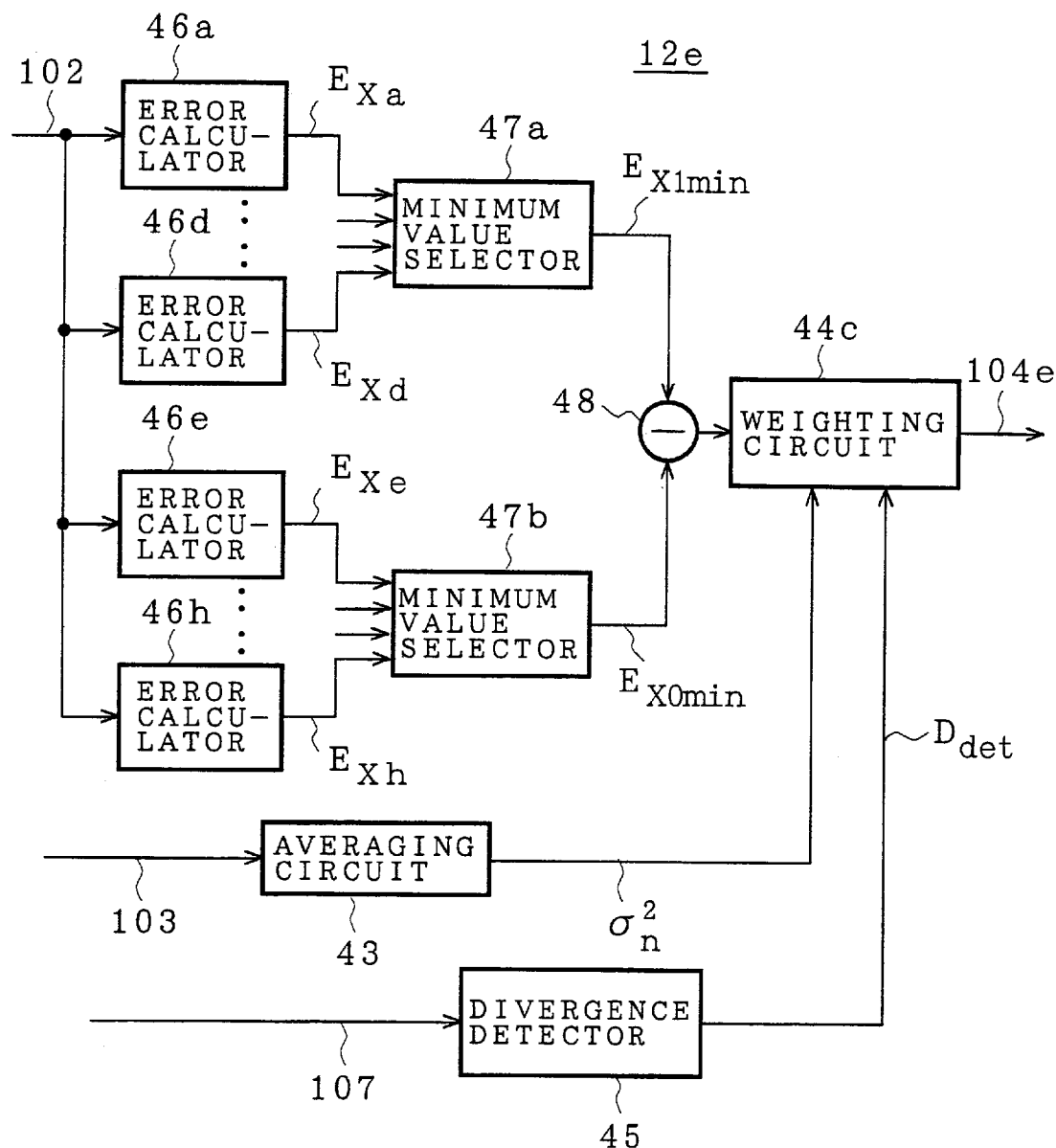
FIG. 18 is a block diagram showing an internal configuration of the reliability information generator in the embodiment 5.

FIG. 18 is a block diagram showing an internal configuration of the reliability information generator 12e, in which corresponding portions to those in FIG. 16 are designated by the same reference numerals, and the description thereof is omitted here. In this figure, the reference numeral 45 designates a divergence detector for detecting from the tap coefficients 107 fed from the adaptive equalizer 11b the divergence of the algorithm of the adaptive equalizer 11b to generate the divergence detection signal $D_{det}$, and 44c designates a weighting circuit which weights the difference between the minimum values $E_{X1min}$ ($E_{Y1min}$) and $E_{X0min}$ (or $E_{Y0min}$) with the average value $\sigma_n^2$ of the equalized square error 103 output from the averaging circuit 43 and the divergence detection signal $D_{det}$ output from the divergence detector 45, thereby generating the reliability information 104e, and supplying it to the deinterleaver 13 as shown in FIG. 17. Here, the minimum value $E_{X1min}$ (or $E_{Y1min}$) is that of the errors $E_{Xa}-E_{Xd}$ (or $E_{Ya}-E_{Yd}$) output from the minimum value selector 47a, and the minimum value $E_{X0min}$ (or $E_{Y0min}$) is that of the errors $E_{Xe}-E_{Xh}$ (or $E_{Ye}-E_{Yh}$) output from the minimum value selector 47b, and the difference between the two minimum values is calculated by the subtracter 48.

In the reliability information generator 12e with this arrangement, the error calculators 46a–46d calculate, as in the embodiment 4, the errors $E_{Xa}-E_{Xd}$ between the soft decision data 102 and the patterns associated with the transmitted data of "1", and the error calculators 46e–46h calculate the errors $E_{Xe}-E_{Xh}$ between the soft decision data 102 and the patterns associated with the transmitted data of "0" in accordance with expressions (14a). The minimum value selectors 47a and 47b select the minimum value $E_{X1min}$ of the errors $E_{Xa}-E_{Xd}$, and the minimum value $E_{X0min}$ of the errors $E_{Xe}-E_{Xh}$, respectively, and supply them to the subtracter 48. On the other hand, the averaging circuit 43 averages the equalized square error 103 over the $N\omega$ symbols as shown by expression (3) to output the average value $\sigma_n^2$ of the equalized square error 103. The divergence detector 45 compares the tap coefficients 107 with a predetermined threshold to detect the divergence of the algorithm of the adaptive equalizer 11b shown in FIG. 17, and outputs the divergence detection signal $D_{det}$.

The subtracter 48, receiving the minimum value $E_{X1min}$ of the errors $E_{Xa}-E_{Xd}$ and the minimum value $E_{X0min}$ of the errors $E_{Xe}-E_{Xh}$ from the minimum value selectors 47a and 47b, obtains the difference of the two minimum values, and supplies it to the weighting circuit 44c. The weighting circuit 44c weights the output of the subtracter 48 with the average value $\sigma_n^2$ of the equalized square error 103 output from the averaging circuit 43 and the divergence detection signal $D_{det}$ output from the divergence detector 45 in accordance with the following expression (17a), thereby supplying the deinterleaver 13 with the resultant value L(X) as the reliability information 104e.

$$L(X) = \begin{cases} \dfrac{(E_{X1min} - E_{X0min})}{-2\sigma_n^2} & (D_{det} = 0) \\ 0 & (D_{det} = 1) \end{cases} \tag{17a}$$

Likewise, with regard to the transmitted data Y, the minimum value $E_{Y1min}$ of the errors $E_{Ya}-E_{Yd}$ and the minimum value $E_{Y0min}$ of the errors $E_{Ye}-E_{Yh}$ are obtained in accordance with expressions (15b), the difference between the two minimum values is weighted in accordance with the following expression (17b) using the average value $\sigma_n^2$ of the equalized square error 103 and the divergence detection signal $D_{det}$, thereby supplying the deinterleaver 13 with the resultant L(Y) as the reliability information 104e.

$$L(Y) = \begin{cases} \dfrac{(E_{Y1min} - E_{Y0min})}{-2\sigma_n^2} & (D_{det} = 0) \\ 0 & (D_{det} = 1) \end{cases} \tag{17b}$$

In this embodiment 5 also, when the adaptive equalizer 11b includes a feedback loop for feeding back the hard decision result of the soft decision data 102 as shown in FIG. 13, it will output random soft decision data 102 independent of the transmitted data if the algorithm of the adaptive equalizer 11b diverges. In this case, the reliability information generator 12e will produce the reliability information 104e indicating high reliability even though the actual reliability is low, if the reliability information 104e is obtained in the same manner as in the embodiment 4, because the equalized square error 103 takes a small value owing to a small difference between the soft decision data 102 and the hard decision result. The present embodiment 5, taking account of this, detects the divergence of the algorithm of the adaptive equalizer 11b from the tap coefficients 107 of the adaptive equalizer 11b to reduce the reliability indicated by the reliability information 104e when it is decided that the algorithm diverges. This will improve the characteristic after the Viterbi decoding as compared with the embodiment 4.

The invention being thus described, it will be obvious that the same may be varied in many ways. Such variations are not to be regarded as departure from the spirit and scope of the invention, and all such modifications as would as would be obvious to one skilled in the art are intended to be included within the scope of the following claims.

What is claimed is:

1. A soft decision decoder comprising:
   an adaptive equalizer for outputting soft decision data by reducing an effect of intercede interference in a received signal;
   a reliability information generator for generating reliability information by performing delay detection of said soft decision data to output first data, and by performing phase rotation of said first data to produce second data, said phase rotation being carried out such that said second data corresponds to transmitted data components, thereby outputting said second data as said reliability information; and a soft decision Viterbi decoder for performing soft decision Viterbi decoding based on said reliability information to output decoded data.

2. The soft decision decoder as claimed in claim 1, wherein said adaptive equalizer further outputs an equalized square error besides said soft decision data; and said reliability information generator, receiving said soft decision data and equalized square error, generates said reliability information by weighting said second data with an average value of said equalized square error.

3. The soft decision decoder as claimed in claim 2, wherein said adaptive equalizer further outputs tap coefficients besides said soft decision data and equalized square error; and said reliability information generator, receiving said soft decision data, equalized square error and tap coefficients, generates said reliability information by weighting said second data with the average value of said equalized square error and a result of detection of divergence of algorithm of said adaptive equalizer, said detection of divergence being carried out using said tap coefficients.

4. A soft decision decoder comprising:

an adaptive equalizer for outputting soft decision data and an equalized square error by reducing an effect of intercede interference in a received signal;

a reliability information generator for generating reliability information by weighting with an average value of said equalized square error a difference between a first minimum value and a second minimum value, said first minimum value being a minimum value of errors between said soft decision data and patterns of two consecutive symbols associated with transmitted data of "1", and said second minimum value being a minimum value of errors between said soft decision data and patterns of two consecutive symbols associated with transmitted data of "0"; and a soft decision Viterbi decoder for performing soft decision Viterbi decoding based on said reliability information to output decoded data.

5. The soft decision decoder as claimed in claim 4, wherein said adaptive equalizer further outputs tap coefficients besides said soft decision data and equalized square error; and said reliability information generator, receiving said soft decision data, equalized square error and tap coefficients, generates said reliability information by weighting said difference between said first minimum value and said second minimum value with the average value of said equalized square error and a result of detection of divergence of algorithm of said adaptive equalizer, said detection of divergence being carried out using said tap coefficients.

* * * * *